(12) United States Patent
Madan et al.

(10) Patent No.: US 12,037,498 B2
(45) Date of Patent: Jul. 16, 2024

(54) FLEXIBLE THERMOELECTRIC GENERATOR FABRICATION USING ENERGY EFFICIENT METHOD

(71) Applicant: UNIVERSITY OF MARYLAND, BALTIMORE COUNTY, Baltimore, MD (US)

(72) Inventors: Deepa Madan, Ellicott City, MD (US); Priyanshu Banerjee, Baltimore, MD (US); Jiyuan Huang, Baltimore, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 0 days.

(21) Appl. No.: 17/706,765

(22) Filed: Mar. 29, 2022

(65) Prior Publication Data

US 2022/0411656 A1 Dec. 29, 2022

Related U.S. Application Data

(60) Provisional application No. 63/167,316, filed on Mar. 29, 2021.

(51) Int. Cl.
  *C09D 105/00* (2006.01)
  *C09D 11/08* (2006.01)
(52) U.S. Cl.
  CPC ............ *C09D 105/00* (2013.01); *C09D 11/08* (2013.01)

(58) Field of Classification Search
  CPC .................................................... C09D 105/00
  See application file for complete search history.

(56) References Cited

PUBLICATIONS

Jang et al., Thermoelectric performance enhancement of naturally occurring bi and chitosan composite films using energy efficient method, Mar. 23, 2020, Electron, vol. 9, No. 523, pp. 1-12 (Year: 2020).*

Madan et al., Enhanced performance of dispenser printed MA n-type Bi2Te3 composite thermoelectronic generators, 2012, ACS Applied Material Interface, vol. 4, No. 11, pp. 6117-6124 (Year: 2012).*

Madan et al., High performance dispenser printed MA p-type Bi(0.5)Sb(1.5)Te(3) flexible thermoelectric generators for powering wireless sensor networks, 2013, vol. 5, No. 22, pp. 11872-11876 (Year: 2013).*

(Continued)

*Primary Examiner* — Robert S Walters, Jr.
*Assistant Examiner* — Andrew J Bowman
(74) *Attorney, Agent, or Firm* — Casimir Jones, S.C.; Tristan A. Fuierer

(57) ABSTRACT

An energy-efficient method of controlling the composite microstructure and resulting thermoelectric (TE) properties of TE composite films. The TE composite films, which include a small amount of naturally occurring chitosan binder that is sufficient to hold TE particles together, are modified by applying uniaxial mechanical pressure at low temperatures for a short duration. The TE composite films have high electrical conductivity and low thermal conductivity, making them ideal for use into high-performance energy harvesting thermoelectric devices.

18 Claims, 18 Drawing Sheets

(56) References Cited

PUBLICATIONS

Abadlia et al., New experimental methodology, setup and LabView program for accurate absolute thermoelectric power and electrical resistivity measurements between 25 and 1600 K: application to pure copper, platinum, tungsten, and nickel at very high temperatures. Rev Sci Instrum. Sep. 2014;85(9):095121. 1-11.
Antimony Telluride, Sb2Te3 MatWeb, Your Source for Materials Information—www.matweb.com. Retrieved from the internet Jul. 27, 2022. 1 page.
Banerjee et al., Thermoelectric Performance Enhancement of n-type Chitosan-Bi2Te2.7Se0.3 Composite Films Using Heterogeneous Grains and Mechanical Pressure. Journal of Electronic Materials, 2021, vol. 50, No. 5, 2840-2851.
Burkov et al., Experimental Set-Up for Thermopower and Resistivity Measurements at 100-1300 K. Meas. Sci. Technol. 2001: 12, 264-272.
Byun et al., Design Strategy for Transformative Electronic System toward Rapid, Bidirectional Stiffness Tuning using Graphene and Flexible Thermoelectric Device Interfaces. Adv Mater. Mar. 2021;33(10):e2007239. 9 pages.
Cao et al., Screen Printable Flexible BiTe—SbTe-Based Composite Thermoelectric Materials on Textiles for Wearable Applications. IEEE Transactions on Electron Devices. 2016, 63, 10, 4024-4030.
Celzard et al., Electrical conductivity of carbonaceous powders. Carbon 40, 2002: 2801-2815.
Champier. Thermoelectric generators: A review of applications. Energy Convers. Manag. 2017:140, 167-181.
Chen et al., Dispenser printed thermoelectric energy generators. Proc. Power MEMS 2009: 277-280.
Chen et al., Dispenser-Printed Planar Thick-Film Thermoelectric Energy Generators. J. Micromech. Microeng. 2011: 21, 104006. 8 pages.
Choi et al., Enhanced Thermoelectric Properties of Screen-Printed Bi0.5Sb1.5Te3 and Bi2Te2.7Se0.3 Thick Films Using a Post Annealing Process with Mechanical Pressure. J. Mater. Chem. C. 2017: 5(33), 8559-8565.
Choi et al., Enhancement of Reproducibility and Reliability in a High-Performance Flexible Thermoelectric Generator Using Screen-Printed Materials. Nano Energy. 2018: 46, 39-44.
Dong et al., Studies on glass transition temperature of chitosan with four techniques. J. Appl. Polym. Sci. 2004: 93, 1553-1558.
Du et al., Eco-Friendly and Biodegradable Biopolymer Chitosan/Y2O3 Composite Materials in Flexible Organic Thin-Film Transistors. Materials. 2017, 10, 1026. 1-9.
Fan et al., P-type Bi0.4Sb1.6Te3 Nanocomposites with Enhanced Figure of Merit. Appl. Phys. Lett. 2010. 96(18), 182104. 4 pages.
Fukui et al., Effect of Mixed Grain Sizes on the Thermoelectric Properties of Ca0.9Yb0.1MnO3. J. Electron. Mater., 2014, 43, 6, 1548-1553.
Gharleghi et al., Enhancing the Thermoelectric Performance of Nanosized CoSb3:via Short-Range Percolation of Electrically Conductive WTe2 Inclusions. J. Mater. Chem. A. 2016. 4(36), 13874-13880.
Glatz et al., Optimization and fabrication of thick flexible polymer based micro thermoelectric generator. Sensors Actuators A Phys 2006; 132:337-45.
Hicks et al., Thermoelectric figure of merit of a one-dimensional conductor. Phys Rev B Condens Matter. Jun. 15, 1993;47(24):16631-16634.
Hochbaum et al., Enhanced thermoelectric performance of rough silicon nanowires. Nature. Jan. 10, 2008;451(7175):163-7.
Hostler et al., Thermoelectric properties of pressed bismuth nanoparticles. Superlattices Microstruct. 2008: 43, 195-207.
Hu et al., The initial powder-refinement-induced donor-like effect and nonlinear change of thermoelectric performance for Bi2Te3-based polycrystalline bulks. Semicond. Sci. Technol. 2017. 32(7), 075004. p. 1-10.

Ioffe. Semiconductor Thermoelements and Thermoelectric Cooling. Infosearch Ltd., London, 1957, pp. 100-101.
Ioffe. Semiconductor Thermoelements and Thermoelectric Cooling. Infosearch Ltd., London, 1957, pp. 86-87.
Ionescu et al., Grain size effects on thermoelectrical properties of sintered solid solutions based on Bi2Te3. Phys. Status Solidi A. 1975. 27(1), 27-34.
Jang et al., Thermoelectric performance enhancement of naturally occurring bi and chitosan composite films using energy efficient method. Electron. 2020: 9, 532; 1-12.
Jang et al., Thermoelectric properties enhancement of p-type composite films using wood-based binder and mechanical pressing. Sci Rep. May 27, 2019;9(1):7869. 1-10.
Jiang et al., Fabrication and thermoelectric performance of textured n-type Bi2(Te,Se)3 by spark plasma sintering. Mater. Sci. Eng. B. 2005. 117, 334-338.
Kim et al., A wearable thermoelectric generator fabricated on a glass fabric. Energy Environ. Sci., 2014, 7,1959-1965.
Kim et al., Characterization of Lorenz number with Seebeck coefficient measurement. APL Mater. 2015. vol. 3, Iss. 4. 041506. 6 pages.
Kishimoto et al., Preparation of Sintered Degenerate N-Type PbTe with a Small Grain Size and its Thermoelectric Properties. J. Appl. Phys. 2002. 92(5), 2544-2549.
Lee et al., Control of oxygen content of n-type Bi2Te3 based compounds by sintering process and their thermoelectric properties. Mater. Lett. 2018. 230, 211-214.
Li et al., Effects of mechanical alloying process and sintering methods on the microstructure and thermoelectric properties of bulk Bi0.5Sb1.5Te3 alloy. Intermetallics. 2013. 43, 16-23.
Li et al., Enhanced thermoelectric performance of Cu2Se/Bi0.4Sb1.6Te3 nanocomposites at elevated temperatures. Appl. Phys. Lett. 2016, 108(6), 3-8.
Li et al., Enhanced thermoelectric properties of n-type Bi2Te3-based nanocomposite fabricated by spark plasma sintering. J. Alloys Compd. 2011. 509(14), 4769-4773.
Liu et al., High Thermoelectric Performance in Crystallographically Textured n-Type Bi 2 Te 3-x Se x Produced from Asymmetric Colloidal Nanocrystals. ACS Nano. Jul. 24, 2018;12(7):7174-7184.
Madan et al., Printed Flexible Thermoelectric Generators for Use on Low Levels of Waste Heat. Appl. Energy. 2015. 156, 587-592.
Madan et al., Conductivity and power factor enhancement of n-type semiconducting polymers using sodium silica gel dopant. APL Mater. 2017. 5(8). 086106. 7 pages.
Madan et al., Dispenser printed circular thermoelectric devised using Bi and Bi0.5Sb1.5Te3. Appl. Phys. Lett. 2014. 104, 013902, 5 pages.
Madan et al., Dispenser Printed Composite Thermoelectric Thick Films for Thermoelectric Generator Applications. J. Appl. Phys. 2011. 109, 034904. 6 pages.
Madan et al., Enhanced performance of dispenser printed MA n-type $Bi_2Te_3$ composite thermoelectric generators. ACS Appl Mater Interfaces. Nov. 2012;4(11):6117-24.
Madan et al., High-performance dispenser printed MA p-type Bi(0.5)Sb(1.5)Te(3) flexible thermoelectric generators for powering wireless sensor networks. ACS Appl Mater Interfaces. Nov. 27, 2013;5(22):11872-6.
Madan et al., Printed Se-doped MA N-Type Bi2Te3 Thick-Film Thermoelectric Generators. J. Electron. Mater. 2012. 41, 1481-1486.
Mamunya et al., Electrical and Thermal Conductivity of Polymers Filled with Metal Powders. Eur. Polym. J. 2002. 38, 1887-1897.
Neto et al., Thermal Analysis of Chitosan Based Networks. Carbohydr. Polym. 2005. 62, 97-103.
Park et al., A flexible micro-thermoelectric generator sticker with trapezoidal-shaped legs for large temperature gradient and high-power density. Adv Mater Techno 2020;5(10):2000486. 1-7.
Park et al., High-performance shape-engineerable thermoelectric painting. Nat Commun. Nov. 11, 2016;7:13403. 1-10.
Poudel et al., High-thermoelectric performance of nanostructured bismuth antimony telluride bulk alloys. Science. May 2, 2008;320(5876):634-8.

(56) References Cited

PUBLICATIONS

Rowe. Thermoelectrics Handbook: Macro to Nano; CRC Press: Boca Raton, 2006. TOC only. 18 pages.

Sahoo et al., Thermal conductivity of freestanding single wall carbon nanotube sheet by Raman spectroscopy. ACS Appl Mater Interfaces. Nov. 26, 2014;6(22):19958-65.

Schrade et al., Versatile apparatus for thermoelectric characterization of oxides at high temperatures. Rev Sci Instrum. Oct. 2014;85(10):103906. 9 pages.

Shin et al., High-Performance Screen-Printed Thermoelectric Films on Fabrics. Sci Rep. Aug. 4, 2017;7(1):7317. 9 pages.

Snyder et al., Complex Thermoelectric Materials. Mater. Sustain. Energy A 2010, 7, 2, 101-114.

Takashiri et al., Effect of grain size on thermoelectric properties of n-type nanocrystalline bismuth-telluride based thin films. J. Appl. Phys. 2008. 104, 084302. 6 pages.

Varghese et al., Flexible thermoelectric devices of ultrahigh power factor by scalable printing and interface engineering, Adv. Funct. Mater. 2019: 30 (5), 1905796. 1-8.

Varghese et al., High-performance and flexible thermoelectric films by screen printing solution-processed nanoplate crystals. Sci Rep. Sep. 12, 2016;6:33135. 1-6.

Vining et al., Thermoelectric properties of pressure-sintered Si0.8Ge0.2 thermoelectric alloys. J. Appl. Phys. 1991. 69, 4333-4340.

Wang et al., Development of MnO2 Cathode Inks for Flexographically Printed Rechargeable Zinc-Based Battery. J. Power Sources 2014, 268, 246-254.

Yan et al., Experimental studies on anisotropic thermoelectric properties and structures of n-type Bi2Te2.7Se0.3. Nano Lett. Sep. 8, 2010;10(9):3373-8.

Yu et al., Thermoelectric behavior of segregated-network polymer nanocomposites. Nano Lett. Dec. 2008;8(12):4428-32.

Yuan et al., Screen-printed radial structure micro radioisotope thermoelectric generator. Appl Energy 2018;225:746-54.

Zhao et al., Effect of Mixed Grain Sizes on Thermoelectric Performance of Bi2Te3 Compound. J. Appl. Phys. 2009: 105, 023704. 6 pages.

Zhao et al., High Conductivity and Electron-Transfer Validation in an n-Type Fluoride-Anion-Doped Polymer for Thermoelectrics in Air. Adv Mater. Sep. 2017;29(34). 1-7.

* cited by examiner

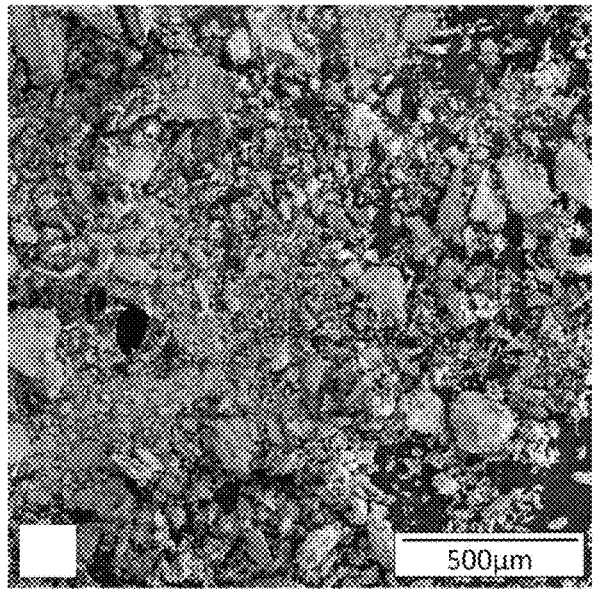
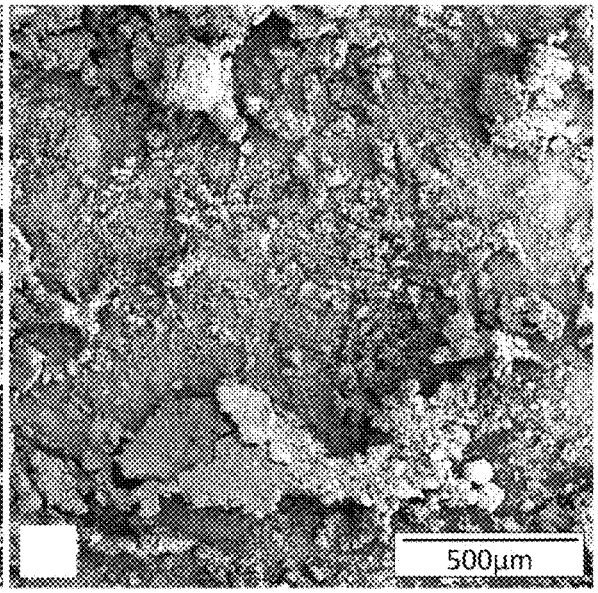
FIGURE 2A FIGURE 2B
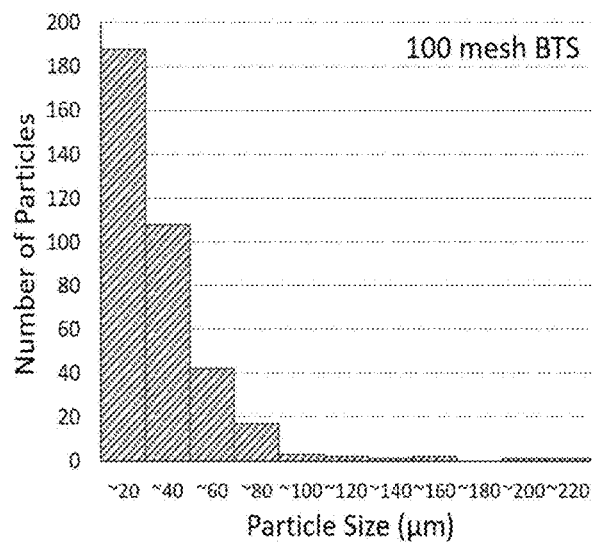
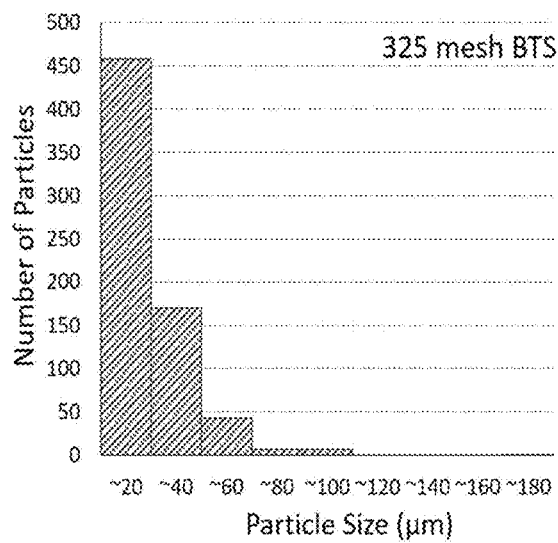
FIGURE 3A FIGURE 3B FIGURE 4A   FIGURE 4B   FIGURE 4C
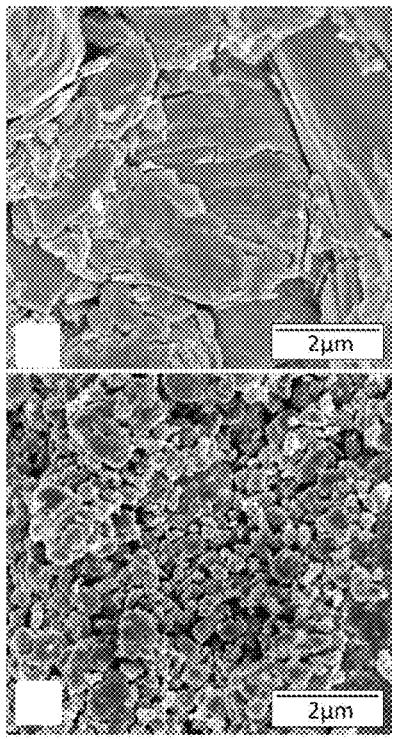 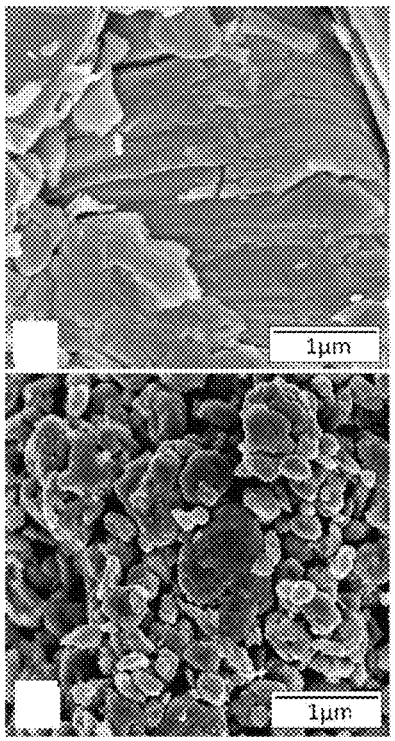 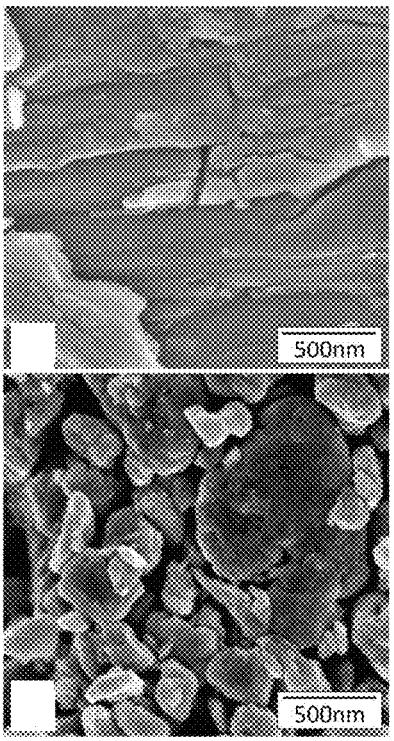
FIGURE 4D   FIGURE 4E   FIGURE 4F
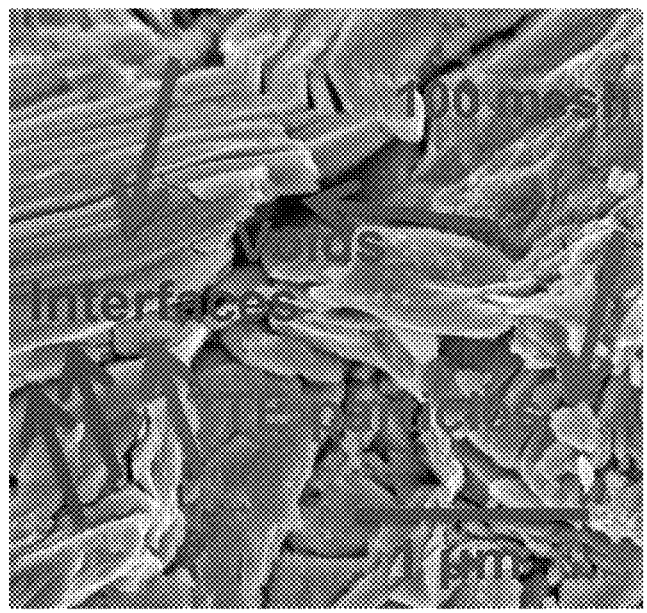
FIGURE 5

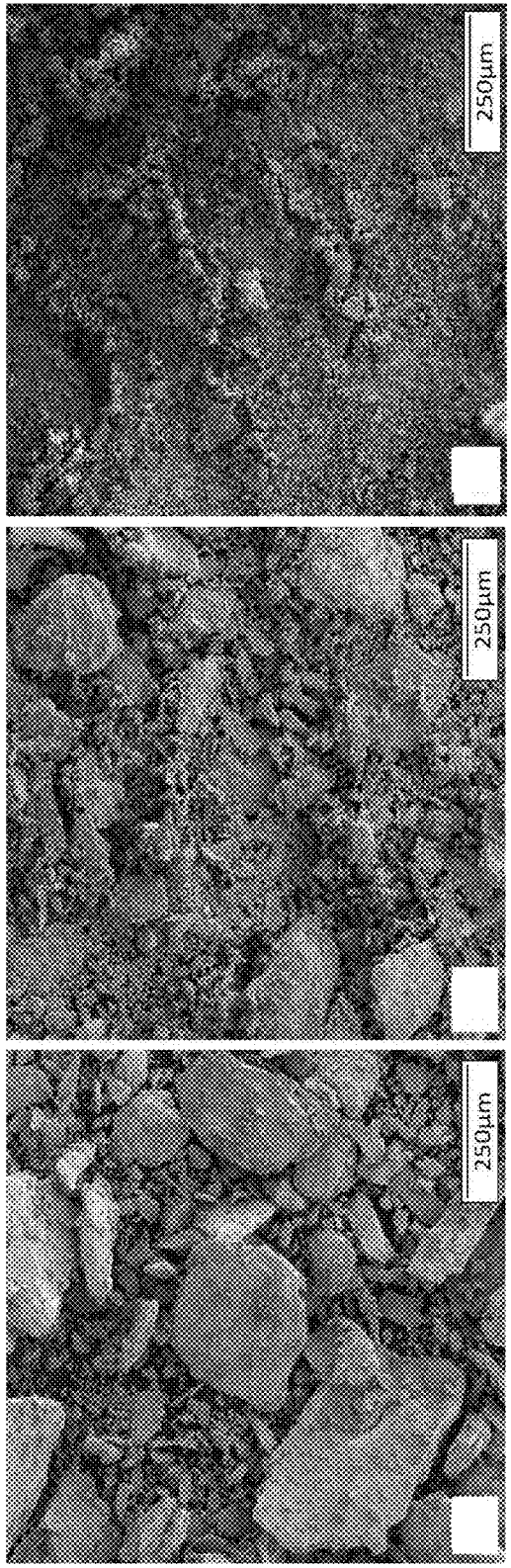
FIGURE 7C
FIGURE 7B
FIGURE 7A
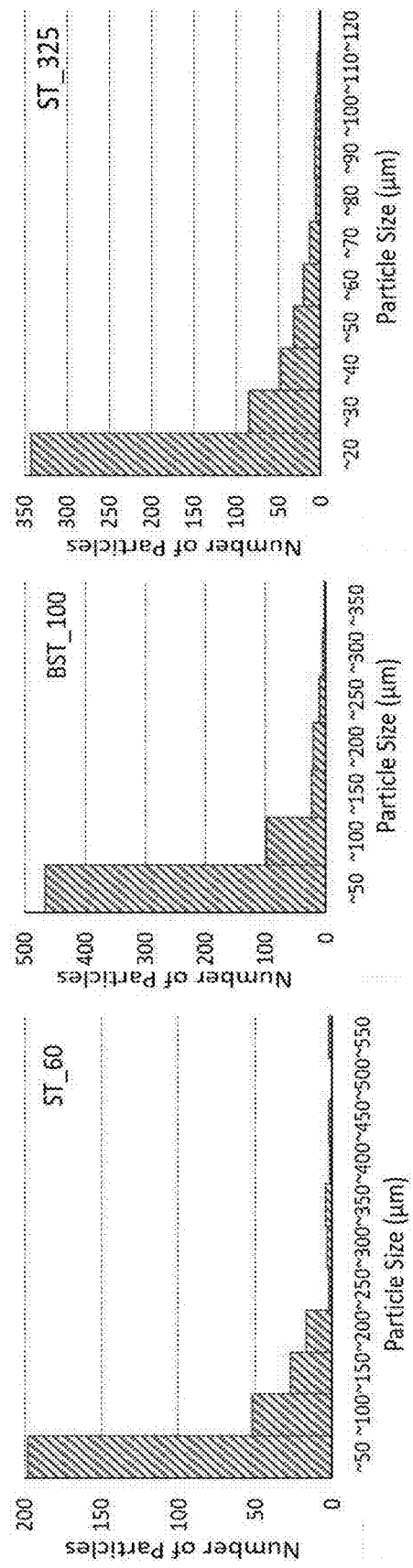
FIGURE 8C
FIGURE 8B
FIGURE 8A FIGURE 10A
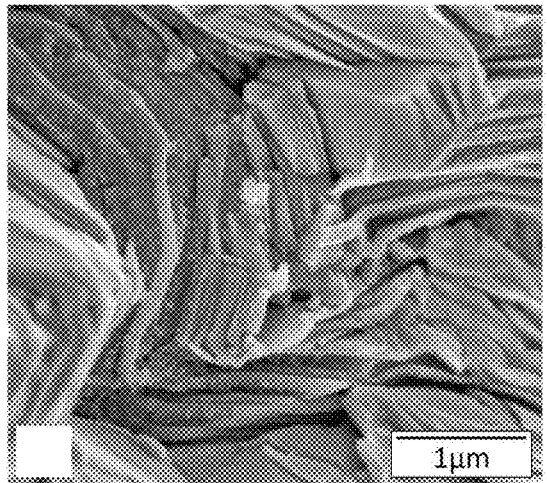
FIGURE 10B
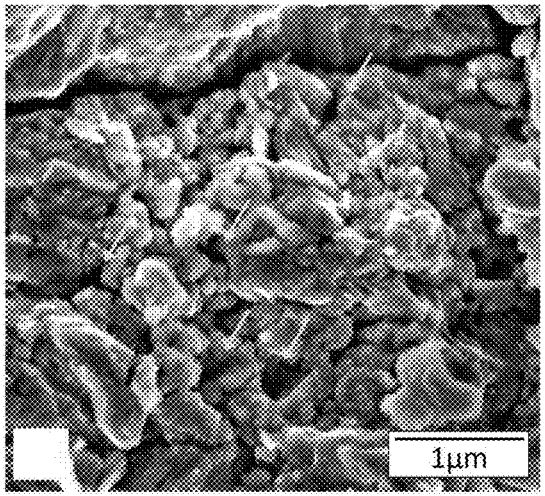
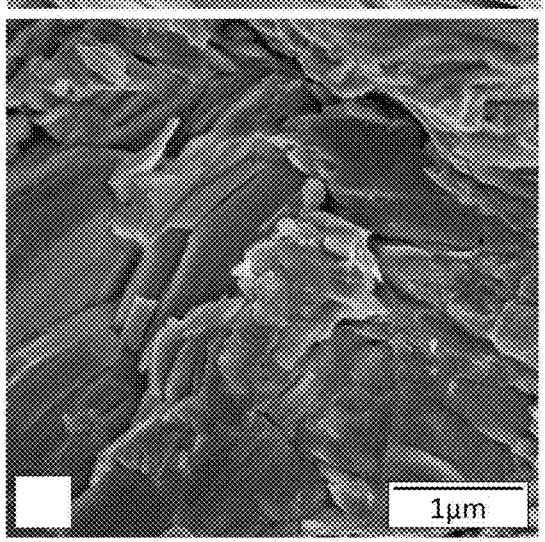
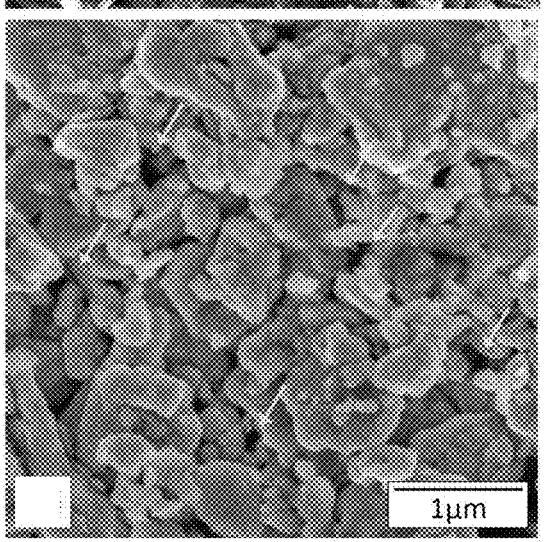
FIGURE 10C
FIGURE 10D
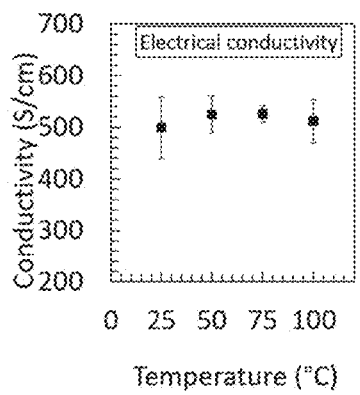
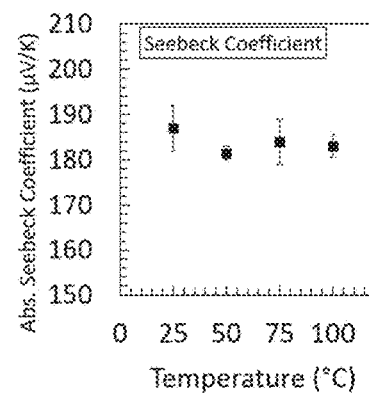
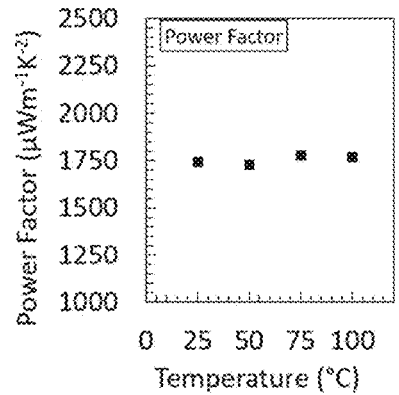
FIGURE 11A
FIGURE 11B
FIGURE 11C FIGURE 13A
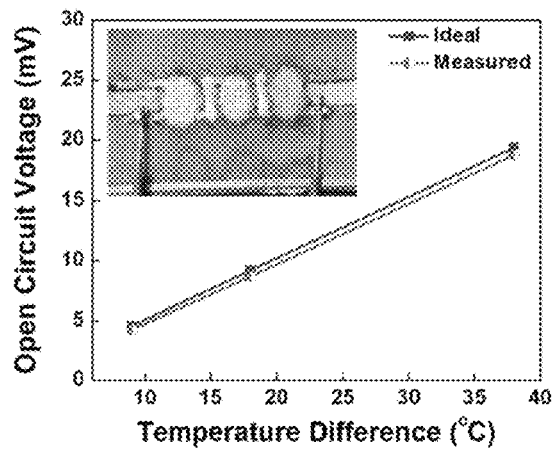
FIGURE 13B
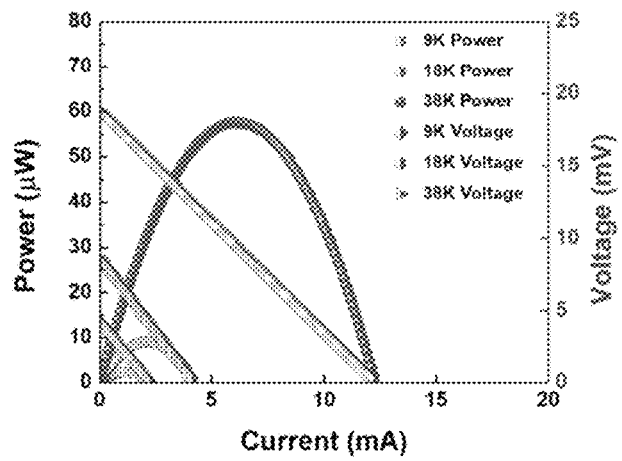
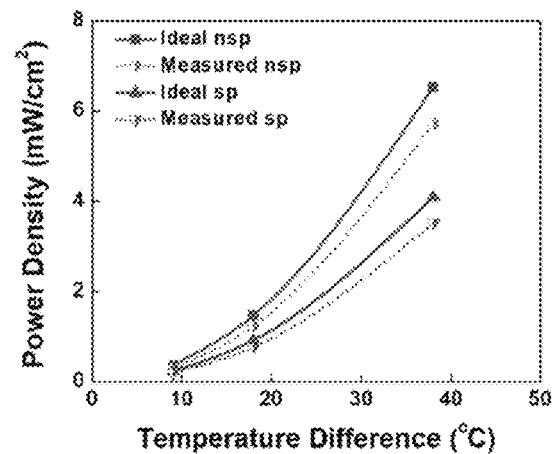
FIGURE 13C
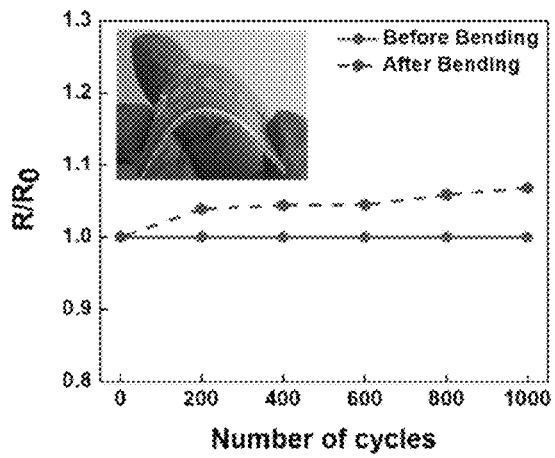
FIGURE 13D

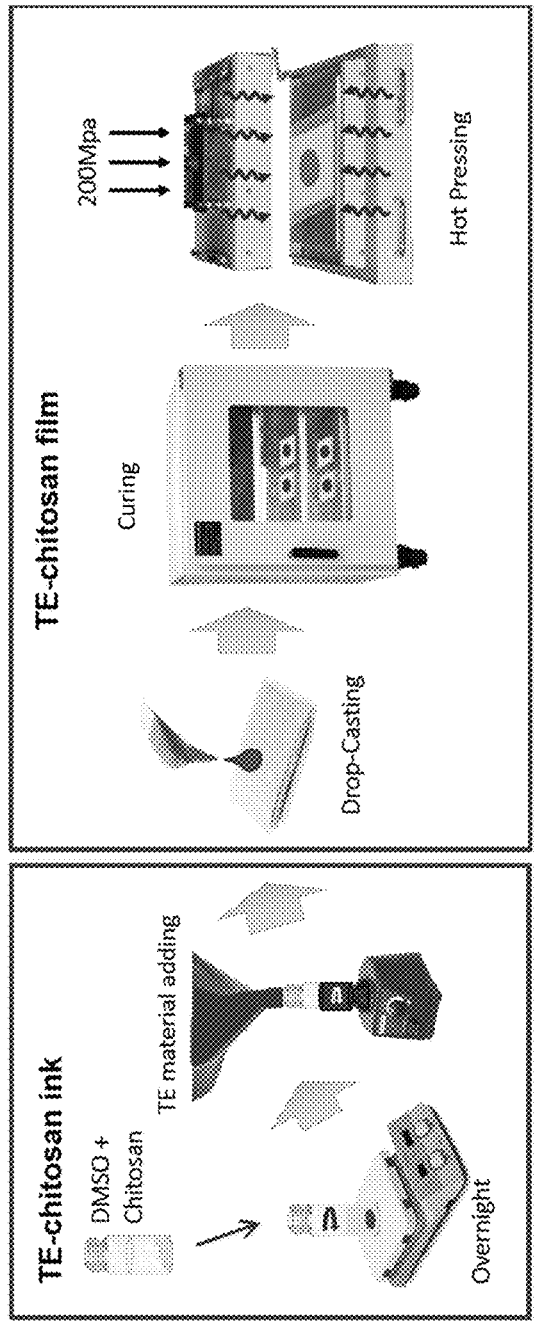
FIG. 14A
FIG. 14B
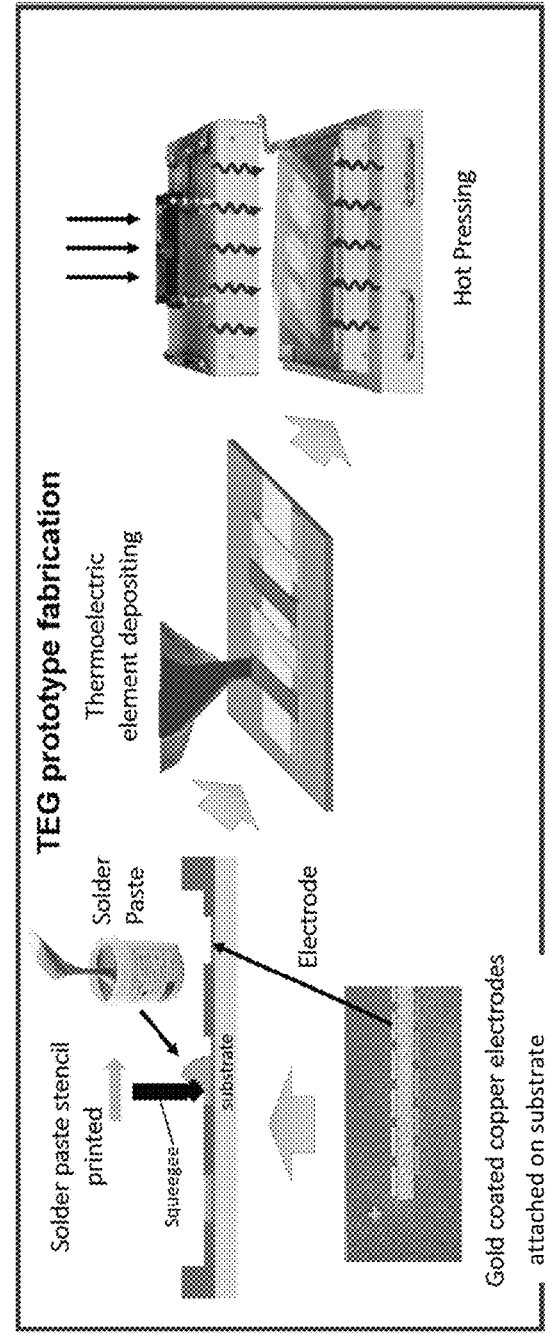
FIG. 14C

FLEXIBLE THERMOELECTRIC GENERATOR FABRICATION USING ENERGY EFFICIENT METHOD

CROSS REFERENCE TO RELATED APPLICATIONS

This application is filed under the provisions of 35 U.S.C. § 111(a) and claims priority to U.S. Provisional Patent Application No. 63/167,316 filed on Mar. 29, 2021 in the name of Deepa Madan et al. and entitled "Flexible Thermoelectric Generator Fabrication Using Energy Efficient Method," which is hereby incorporated by reference herein in its entirety.

FIELD

The present invention relates to an inexpensive and energy-saving method of fabricating thermoelectric generator devices that can be employed for low-waste heat applications. The method involves a synergistic approach, using a small amount of chitosan binder, a heterogenous distribution of thermoelectric particles of varying size, low temperature and short duration curing, and application of uniaxial mechanical pressure to reduce the grain boundaries and interfacial connections and to enhance electrical conductivity of thermoelectric composite films and thermoelements comprising same in the thermoelectric generator devices.

BACKGROUND

No energy conversion process is 100% efficient and many processes waste energy in the form of heat. Energy harvesting devices, such as thermoelectric generators (TEG) can recover heat energy and convert it into electricity. TEGs are energy harvesting devices that do not require maintenance because of their lack of mobile parts making them reliable, industrially expandable and environmentally friendly (Ioffe (1957a), Champier (2017), Snyder (2010), Hochbaum (2008)). The use of these devices as power sources has multiple industrial, military, and medical applications (e.g., implantable and wearable medical devices).

Additive manufacturing of flexible thermoelectric generators (TEGs), including dispenser printing or screen-printing, has proved promising in addressing the pitfalls of traditionally manufactured TEGs, promising to deliver low-cost and high-energy-density devices that can potentially charge batteries by harvesting otherwise waste heat from planar and non-planar surfaces (Madan (2017), Zhao (2017), Chen (2009)). This technology can use a printer to deposit thermoelectric composite ink onto substrates while minimizing the labor effort and the materials waste from dicing the bulk materials to obtain thermoelements. Further, this technique has flexibility in obtaining a high aspect ratio of TEG devices and a high number of couples (Park (2020)). Disadvantageously, printed TEGs of the prior art perform poorly compared with TEGs made from bulk materials (Yuan (2018)). Unlike bulk materials, the printing methods use thermoelectric materials in a special ink form, which have traditionally been synthesized using micro-size or nano-size thermoelectric (TE) particles combined with a high amount (e.g., >5-30 wt %) of insulating binder (Chen (2011), Madan (2017), Byun (2021)). Because of the low electrical conductivity of the binder, the thermoelectric performance of printed TE films is negatively affected, reducing the overall performance of the TEGs. Moreover, traditional additive manufacturing methods involve energy-intensive (long-duration and high-temperature) curing processes.

There is a continued need for improved thermoelectric materials for use in thermoelectric generators, and to methods of obtaining same. By using the thermoelectric inks comprising chitosan and methods described herein, the energy usage in the additive manufacturing of thermoelectric films is significantly reduced, in part because the energy-intensive high-temperature curing is eliminated. Moreover, the utilization of earth abundant materials like chitosan can contribute to the reduction of the cost per unit area of the fabricated TEGs thereby helping to achieve the goal of mass production of TEGs.

SUMMARY

In one aspect, a thermoelectric (TE) ink is described, said TE ink comprising at least one thermoelectric material, chitosan, and at least one solvent, wherein the amount of chitosan present in the TE ink is in a range from greater than zero to less than about 1 wt %, based on the total weight of the TE ink.

In another aspect, a method of making a thermoelectric composite film is described, said method comprising:
  applying the thermoelectric (TE) ink onto a substrate, wherein a TE film is drop-casted or screen-printed onto the substrate;
  curing the TE film at a curing temperature for a time necessary to drive off the at least one solvent; and
  applying uniaxial pressure in a range from about 100 MPa to about 300 MPa to the cured TE film, at temperature in a range from about 100° C. to about 200° C., for time in a range from about 5 minutes to about 100 minutes, to modify the at least one TE material to produce a modified TE composite film having a have a figure of merit (ZT) in a range of at least about 0.5 to 1.0,
wherein the TE ink comprises at least one thermoelectric material, chitosan, and at least one solvent, wherein the amount of chitosan present in the TE ink is in a range from greater than zero to less than about 1 wt %, based on the total weight of the TE ink.

In still another aspect, a thermoelectric (TE) composite film is described, said TE composite film comprising at least one modified thermoelectric material in a chitosan polymer binder, wherein the amount of chitosan present in the TE composite film is in a range from greater than zero to less than about 1 wt %, based on the total weight of the TE ink, wherein the TE composite film has a figure of merit (ZT) in a range of at least about 0.5 to 1.0.

In another aspect, a thermoelectric generator (TEG) comprising N-type and P-type thermoelements is described, wherein at least one thermoelement comprises a thermoelectric (TE) composite film comprising at least one modified thermoelectric material in a chitosan polymer binder, wherein the amount of chitosan present in the TE composite film is in a range from greater than zero to less than about 1 wt %, based on the total weight of the TE ink, wherein the TE composite film has a figure of merit (ZT) in a range of at least about 0.5 to 1.0.

Other aspects, features and embodiments of the invention will be more fully apparent from the ensuing disclosure and appended claims.

BRIEF DESCRIPTION OF THE FIGURES

FIG. 2A is an SEM image of 100 mesh BTS TE particles in their powder form.

FIG. 2B is an SEM image of 325 mesh BTS TE particles in their powder form.

FIG. 3A illustrates the number of particles by the particle sizes of 100 mesh BTS TE particles in their powder form.

FIG. 3B illustrates the number of particles by the particle sizes of 325 mesh BTS TE particles in their powder form.

FIG. 4A is an SEM image of 100 mesh BTS-chitosan composite film after uniaxial pressing at 200 MPa.

FIG. 4B is an SEM image of 100 mesh BTS-chitosan composite film after uniaxial pressing at 200 MPa.

FIG. 4C is an SEM image of 100 mesh BTS-chitosan composite film after uniaxial pressing at 200 MPa.

FIG. 4D is an SEM image of 325 mesh BTS-chitosan composite film after uniaxial pressing at 200 MPa.

FIG. 4E is an SEM image of 325 mesh BTS-chitosan composite film after uniaxial pressing at 200 MPa.

FIG. 4F is an SEM image of 325 mesh BTS-chitosan composite film after uniaxial pressing at 200 MPa.

FIG. 5 is a SEM image of BTS-chitosan composite films showing the presence of nano scale voids, nano scale TE particles, and interfaces.

FIG. 7A is an SEM image of ST-60 mesh TE materials in their particle form.

FIG. 7B is an SEM image of BST-100 mesh TE materials in their particle form.

FIG. 7C is an SEM image of ST-325 mesh TE materials in their particle form.

FIG. 8A illustrates the number of particles versus ST-60 mesh particle sizes.

FIG. 8B illustrates the number of particles versus BST-100 mesh particle sizes.

FIG. 8C illustrates the number of particles versus ST-325 mesh particle sizes.

FIG. 10A is an SEM images of ST-60 (1:2000) chitosan-TE composite films after uniaxial pressing.

FIG. 10B is an SEM images of ST-325 (1:2000) chitosan-TE composite films after uniaxial pressing.

FIG. 10C is an SEM images of BST-100 (1:2000) chitosan-TE composite films after uniaxial pressing.

FIG. 10D is an SEM images of BST-325 (1:2000) chitosan-TE composite films after uniaxial pressing.

FIG. 11A shows the electrical conductivity of chitosan—BST-100 films (1:2000 wt. ratio) at 200 MPa at 25° C., 50° C., 75° C., and 100° C.

FIG. 11B shows the Seebeck coefficient of chitosan—BST-100 films (1:2000 wt. ratio) at 200 MPa at 25° C., 50° C., 75° C., and 100° C.

FIG. 11C shows the power factor of chitosan—BST-100 films (1:2000 wt. ratio) at 200 MPa at 25° C., 50° C., 75° C., and 100° C.

FIG. 13A shows the ideal and measured open-circuit voltage vs. temperature difference ($\Delta T$) results of a three-element TEG prototype.

FIG. 13B shows the TEG voltage and power curve at $\Delta T$ of 9 K, 18 K, and 38 K results of a three-element TEG prototype.

FIG. 13C shows the ideal and measured power density at various $\Delta T$, with (sp) and without (nsp) including the spacing area results of a three-element TEG prototype.

FIG. 13D shows the normalized resistance of TEG vs. bending cycles, where the $R_0$ and R are resistance before and after bending.

FIG. 14A is a process schematic for TE-chitosan ink.

FIG. 14B is a process schematic for TE-chitosan film.

FIG. 14C is a process schematic for TEG prototype fabrication.

DETAILED DESCRIPTION, AND PREFERRED EMBODIMENTS THEREOF

Figure 1A:
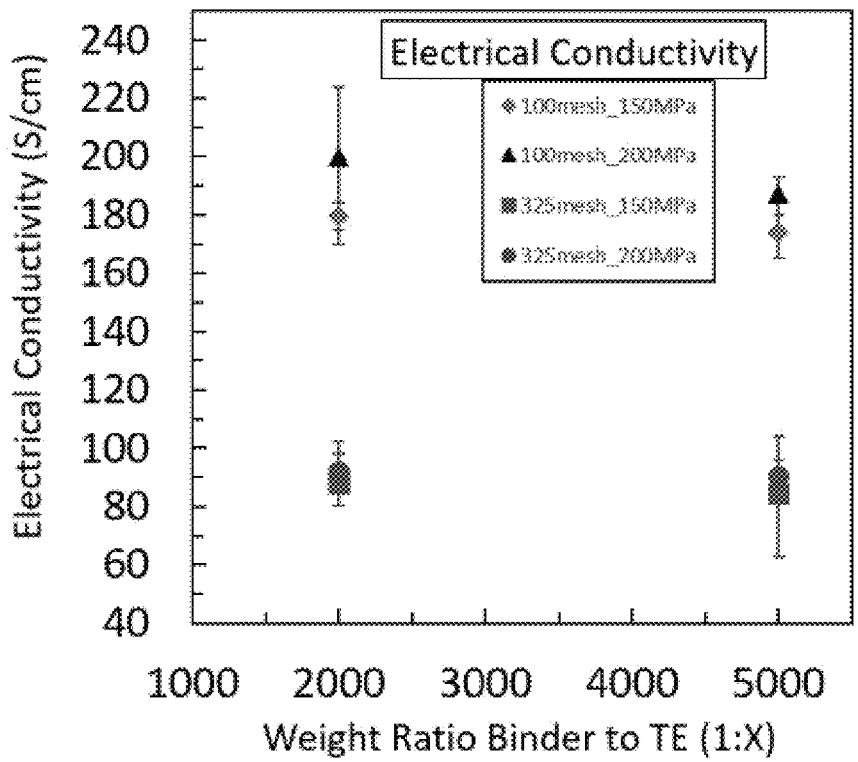
FIG. 1A shows the electrical conductivity of chitosan-BTS TE composite films at two different binder-to-particle weight ratios of 1:2000 and 1:5000 at two different pressures of 150 MPa and 200 MPa and two different grain sizes—100 mesh and 325 mesh—at room temperature.

The present disclosure relates to improved thermoelectric materials for use in thermoelectric generators, and to methods of obtaining same.

"Substantially devoid" is defined herein to mean that none of the indicated additives is intentionally added to or present in the zinc-based battery described herein.

As used herein, "about," "approximately," "substantially," and the like, when used in connection with a numerical variable, can generally refer to the value of the variable and to all values of the variable that are within the experimental error (e.g., within the 95% confidence interval for the mean) or within +1-5% of the indicated value, whichever is greater.

As used herein, the generic word "particles" can correspond to both nanoparticles and/or microparticles.

Thermoelectric inks for printable TEGs are typically synthesized by mixing thermoelectric (TE) particles with a suitable polymer binder, which can provide adhesion strength to TE particles in composite films (Madan (2014)). The viscosity of the ink is adjustable based on the amount of solvent incorporated. The printed composite film typically comprises active particles suspended in an uncured polymer binder matrix, which can be cured by annealing at high temperatures for long periods of time (up to 18 h at 350-500° C.). The prior art printed films have suffered from low performance for two main reasons: first, the presence of insulating binder and/or poor interfacial connection between active particles, which results in lower electrical conductivity; and second, the interdependence of electron- and phonon transport properties in composite films, which limits the ability to achieve both high electrical conductivity and low thermal conductivity simultaneously. The previous reports on TE demonstrated that a higher-mass loading of insulating polymer binder in composite films (typically 20-30 wt %) causes a significant loss of electrical conductivity due to poor connections between thermoelectric particles. Although the high-temperature sintering of as-printed composite films enhances their thermoelectric performance, the process is energy-intensive and unsuitable for large-scale and environmentally-friendly additive manufacturing of flexible thermoelectric devices.

Broadly, the present invention relates to thermoelectric inks, thermoelectric composite films, and printed thermoelectric generators, and methods of making same. The thermoelectric inks can be used to print thermoelectric composite films and/or thermoelectric generators, wherein the thermoelectric inks comprise at least one thermoelectric material and the polymer binder chitosan. The printed thermoelectric composite films and/or thermoelectric generators are modified using uniaxial pressure (e.g., about 150-250 MPa) at temperatures below about 150° C.

In a first aspect, a thermoelectric ink is disclosed, wherein the thermoelectric (TE) ink comprises at least one thermoelectric material, the polymer binder chitosan, and at least one solvent. The solvent comprises a species selected from the group consisting of dimethyl sulfoxide, salicylic acid, acetic acid, deionized water, and any combination thereof. In one embodiment, the solvent comprises dimethyl sulfoxide (DMSO) to dissolve the chitosan. In one embodiment, the solvent comprises a mixture of dimethyl sulfoxide and salicylic acid. Because oxidation arises in N-type films, preferably the solvent is substantially devoid of water, however water can be used as a solvent for P-type films.

Chitosan (polysaccharide composed mainly of β-(1,4)-linked 2-deoxy-2-amino-D-glucopyranose units) is one of the most abundantly available natural biopolymers derived from poly (N-acetyl-d-glucosamine) (chitin) which is commonly found in shrimp and crab shells. It has many advantages including, but not limited to, high transparency, non-toxicity, biodegradability, biocompatibility, and excellent mechanical strength. In addition, chitosan is not a water-based binder and as such there will be no rapid oxidation of the composite film (Du (2017)). To the best of the applicant's knowledge, chitosan has never been explored as a potential binder for printing thermoelectric films. Due to the high mechanical strength of chitosan, a very small amount of the polymer binder is sufficient to hold the TE particles together. In addition, chitosan organic binder has a glass transition temperature between 140-150° C. and does not thermally degrade below 250° C. (Dong (2004), Neto (2005)), ensuring good performance for low waste heat TE applications (Madan (2014), (Madan (2012b), Madan (2013), Madan (2015)). The amount of chitosan present in the TE ink is in a range from greater than zero to less than about 1 wt %, based on the total weight of the TE ink. In one embodiment, the amount of chitosan present in the TE ink is in a range from greater than zero to less than about 0.1 wt %, based on the total weight of the TE ink. In another embodiment, the amount of chitosan present in the TE ink is in a range from greater than zero to less than about 0.05 wt %, based on the total weight of the TE ink. In yet another embodiment, the amount of chitosan present in the TE ink is in a range from greater than zero to less than about 0.01 wt %, based on the total weight of the TE ink.

The at least one TE material can be a P-type or an N-type TE material. In one embodiment, the P-type thermoelectric material is bismuth-telluride (Bi—Te)-based and further includes at least one of antimony (Sb), nickel (Ni), aluminum (Al), copper (Cu), silver (Ag), lead (Pb), boron (B), gallium (Ga), indium (In), bismuth (Bi), tellurium (Te), zinc (Zn), sulfur (S), silicon (Si), selenium (Se), iron (Fe), chromium (Cr), cadmium (Cd), tin (Sn), germanium (Ge), calcium (Ca), or any combination thereof. In one embodiment, the P-type TE material comprises $Bi_{0.5}Sb_{1.5}Te_3$ (BST), In another embodiment, the P-type material comprises Sb and Te, for example, $Sb_2Te_3$. In another embodiment, the P-type material comprises $Cu_{12}Sb_4S_{13}$ (Tetrahedrite) or $Cu_{10}Ni_2Sb_4S_{13}$, wherein either can further include at least one of Cu, Ni, Zn, Sb, S, Si, Te, Se, Fe, Cr, Cd, Sn, Ge, Ca, Pb, or any combination thereof. In one embodiment, the N-type thermoelectric material is bismuth-telluride (Bi—Te)-based and further includes at least one of selenium (Se), nickel (Ni), aluminum (Al), copper (Cu), silver (Ag), lead (Pb), boron (B), gallium (Ga), indium (In), magnesium (Mg), silicon (Si), tin (Sn), bismuth (Bi), tellurium (Te), sulfur (S), or any combination thereof. In one embodiment, the N-type TE material comprises $Bi_2Te_{2.7}Se_{0.3}$ (BTS). In another embodiment, the N-type material comprises Bi. In still another embodiment, the ink comprises SiGe nanoparticles, which optionally are doped with phosphorus (P), arsenic (As), strontium (Sr), boron (B), Magnesium (Mg), Silicon (Si), Tin (Sn), Germanium (Ge), or any combination thereof.

Regardless of whether P-type or N-type, the TE material preferably comprises a heterogeneous distribution of particle sizes (some combination of micro- and nanoparticles). As defined herein, a "heterogeneous distribution of particle sizes" or "heterogeneous size distribution of particles" corresponds to a collection of particles that can pass through a 100-mesh size, or smaller, sieve, wherein a 100-mesh sized sieve is understood to have 149 micron openings. It is understood by the person skilled in the art that some particles that pass through the 149 micron sieve will have a particle size greater than 149 microns (because particles can be of various 3D shapes (e.g., cylindrical, conical, elliptical, prismatic)). In one embodiment, at least 60% of the particles that pass through the 149 micron sieve will be 149 microns in size or below. In one embodiment, at least 70% of the particles that pass through the 149 micron sieve will be 149 microns in size or below.

Accordingly, the first aspect relates to a thermoelectric (TE) ink comprising at least one thermoelectric material, chitosan, and at least one solvent, wherein the amount of chitosan present in the TE ink is in a range from greater than zero to less than about 1 wt %, based on the total weight of the TE ink. In one embodiment, the amount of chitosan present in the TE ink is in a range from greater than zero to less than about 0.1 wt %, based on the total weight of the TE ink. In another embodiment, the amount of chitosan present in the TE ink is in a range from greater than zero to less than about 0.05 wt %, based on the total weight of the TE ink. In yet another embodiment, the amount of chitosan present in the TE ink is in a range from greater than zero to less than about 0.01 wt %, based on the total weight of the TE ink. The at least one TE material comprises a heterogeneous size distribution of P-type or N-type TE particles. In one embodiment, the at least one TE material comprises bismuth and telluride. In one embodiment, the P-type thermoelectric material comprises a bismuth-telluride (Bi—Te)-base and further includes at least one of Sb, Ni, Al, Cu, Ag, Pb, B, Ga, Bi, Te, Zn, S, Si, Se, Fe, Cr, Cd, Sn, Ge, Ca, In, or any combination thereof. In one embodiment, the P-type TE material comprises $Bi_{0.5}Sb_{1.5}Te_3$ (BST). In one embodiment, the N-type thermoelectric material comprises a bismuth-telluride (Bi—Te)-base and further includes at least one of Se, Ni, Al, Cu, Ag, Pb, B, Ga, Mg, Si, Sn, Bi, Te, S, In, or any combination thereof. In one embodiment, the N-type TE material comprises $Bi_2Te_{2.7}Se_{0.3}$ (BTS). In one embodiment, the at least one TE material comprises nanoscale particles and microscale particles, wherein at least 60% of the TE particles are 149 microns in size, or less. In one embodiment, the solvent comprises dimethyl sulfoxide (DMSO). In one embodiment, the solvent comprises DMSO and salicylic acid.

In a second aspect, the preparation of the TE ink of the first aspect is disclosed. To make the TE ink, the chitosan is combined with the at least one solvent and vigorously stirred at temperature in a range from about 50-100° C., preferably about 75° C., for about 2-12 hours. Following dissolution, the TE particles having a heterogeneous distribution of particle sizes, as described herein, are added to the chitosan binder solution. The combined weight ratio of chitosan binder solution:thermoelectric particles can be in a range from about 1:100-1:1000, preferably about 1:500-1:5000, and even more preferably in a range from about 1:500-1:2500. In one embodiment, the combined weight ratio of chitosan binder solution:thermoelectric particles is about 1:2000. Additional solvent can be added, as necessary, to attain the preferred viscosity for TE film and/or TE generator fabrication, as readily understood by the person skilled in the art. The preparation of the TE ink is shown schematically in FIG. 14A.

Figure 18:
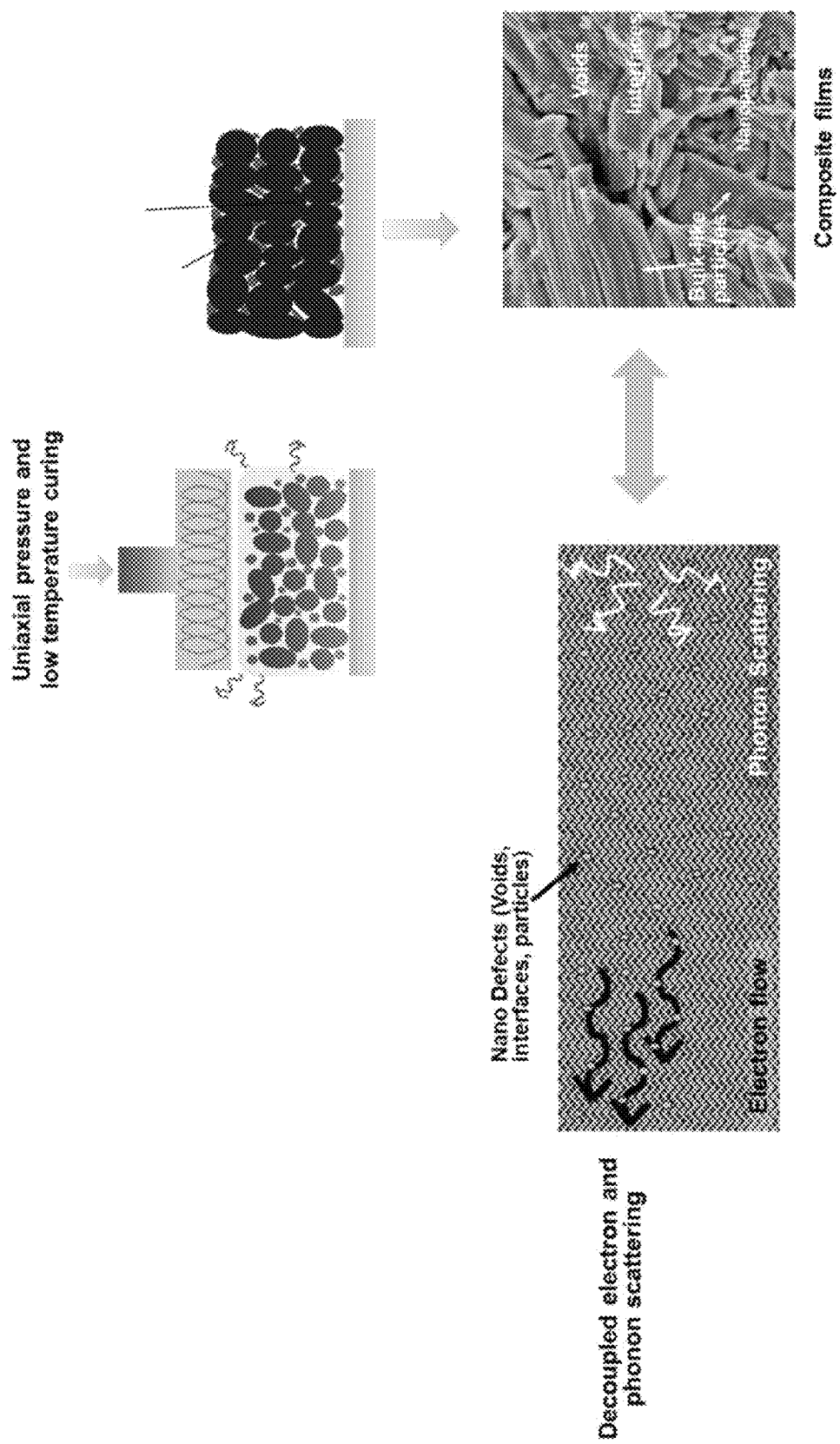
FIG. 18 is a schematic illustration showing the uniaxial pressure and low temperature curing of a TE ink comprising a heterogeneous distribution of TE particles and chitosan binder and an SEM and schematic of the final TE composite film.

In a third aspect, a method of making a thermoelectric composite film from a TE ink is described. In one embodiment, the TE ink is the TE ink of the first aspect. One embodiment of the method of making a TE composite film from the TE ink is shown schematically in FIG. 14B. A TE ink (e.g., the TE ink of the first aspect, but not limited thereto), wherein the TE particles are substantially homogeneously dispersed within the TE ink prior to application, can be drop-casted (see, e.g., FIG. 14B) or screen-printed onto a substrate. Once a film having the desired size and thickness is applied, the film can be cured at a low temperature, for example less than about 150° C., for a time necessary to drive off the at least one solvent present in the TE ink. When the solvent comprises DMSO, the time necessary is in a range from about 5 minutes to about 30 minutes depending on the curing temperature. In one embodiment, the time necessary for removing DMSO is about 10 minutes at 120° C. Notably, the temperatures used for curing are too low to degrade the chitosan and as such, no binder removal is expected. After curing, the cured TE film (i.e., the TE film that is substantially devoid of solvent) undergoes applied pressure densification to modify the heterogeneous distribution of TE particle sizes such that the smaller particles fill the voids between the larger particles. The applied pressure densification step involves the application of uniaxial pressure of about 100 to about 300 MPa, preferably about 150 to about 250 MPa, and more preferably about 180 to about 220 MPa, at temperature in a range from about 100° C. to about 200° C., preferably about 120° C. to about 150° C., for time in a range from about 5 minutes to about 100 minutes, preferably about 15 minutes to about 45 minutes. The applied densification step can be performed in the presence of an inert gas such as nitrogen. Because the TE ink of the first aspect comprises a heterogeneous distribution of TE particle sizes, the presence of fine (nanoscale) particles among coarse (microscale) particles helps achieve better packing density and, therefore, resulted in higher electrical conductivity. By filling the voids between the larger particles with the smaller particles, the applied pressure densification step enhances the inter-connections and forms longer continuous paths, which will enable the charge carriers to flow smoothly without getting scattered. Further, the resultant TE composite films will be compact, dense, and have fewer grain boundaries. This is schematically depicted in FIG. 18.

It should be appreciated that, when necessary, uniaxial pressures and high temperatures (e.g., between 150-250° C.) and longer modification durations can be used to modify the composite TE film, as readily understood by the person skilled in the art.

Regarding the substrate of the third aspect, any material can be used, whether flexible or rigid. The substrate material can be any material with low thermal conductivity including, but not limited to, polymer, foam, silicone, glass, textiles (woven or unwoven), a combination of a polymer and a textile, ceramic, KEVLAR ([—CO—C$_6$H$_4$—CO—NH—C$_6$H$_4$—NH-]$_n$), KAPTON (poly (44-oxydiphenylene-pyromellitimide)), various polyimide-laminate circuit-board materials such as EP2, 85N, 35N, or any combination thereof. Optionally, prior to application of the TE ink onto the substrate, the substrate is coated with a coating material to make the substrate surface more uniform/smooth and to minimize the infiltration of the TE inks into the substrate. In one embodiment, the coating material comprises chitosan. In one embodiment, the coating materials comprises epoxy. In one embodiment of the invention, the substrate comprises a flexible material such as KEVLAR with a coating of chitosan thereon.

It should be appreciated to the person skilled in the art that a substrate can be chosen that can be removed following application and modification of the TE composite film. For example, a non-sticky substrate such as KAPTON, or the equivalent thereof, can be used and the TE composite film can be peeled off said substrate. Alternatively, a substrate can be used that is soluble in a solvent that cannot solubilize the TE composite film.

Advantageously, the method of the third aspect benefits from the synergism of combining a small amount of chitosan binder (<1 wt %), a heterogenous TE particle-size distribution, the applied pressure densification to control the composite microstructure, and low curing temperatures (<150° C.) for short time durations (about 30 min). A wide distribution of mixed-sized particles, when subjected to external pressure, form big grains (plastic deformation) which have large mean free paths to allow charge carriers to flow easily and cause less scattering at the grain boundary. Furthermore, the size and density of nano-sized TE particles, defects, and interfaces distributed among large grains of active particles can increase the interfacial thermal resistance and phonon scattering, helping to reduce the thermal conductivity of the composite films without significantly affecting their electrical conductivity. Preferably, the TE composite films have a figure of merit (ZT) in a range of at least about 0.5 to 1.0, more preferably in a range of at least about 0.6 to 1.0, and even more preferably in a range of at least about 0.7 to 1.0.

According, the third aspect relates to a method of making a thermoelectric composite film, said method comprising:
applying a thermoelectric (TE) ink onto a substrate, wherein the TE ink comprises at least one thermoelectric material, chitosan, and at least one solvent, wherein the amount of chitosan present in the TE ink is in a range from greater than zero to less than about 1 wt %, based on the total weight of the TE ink, and wherein a TE film is drop-casted or screen-printed onto the substrate;
curing the TE film at a curing temperature for a time necessary to drive off the at least one solvent; and
applying uniaxial pressure in a range from about 100 MPa to about 300 MPa to the cured TE film, at temperature in a range from about 100° C. to about 200° C., for time in a range from about 5 minutes to about 100 minutes, to modify the at least one TE material to produce a modified TE composite film having a have a figure of merit (ZT) in a range of at least about 0.5 to 1.0.

The at least one TE material comprises a heterogeneous size distribution of P-type or N-type TE particles. In one embodiment, the at least one TE material comprises bismuth and telluride. In one embodiment, the P-type thermoelectric material comprises a bismuth-telluride (Bi—Te)-base and further includes at least one of Sb, Ni, Al, Cu, Ag, Pb, B, Ga, Bi, Te, Zn, S, Si, Se, Fe, Cr, Cd, Sn, Ge, Ca, In, or any combination thereof. In one embodiment, the P-type TE material comprises Bi$_{0.5}$Sb$_{1.5}$Te$_3$ (BST). In one embodiment, the N-type thermoelectric material comprises a bismuth-telluride (Bi—Te)-base and further includes at least one of Se, Ni, Al, Cu, Ag, Pb, B, Ga, Mg, Si, Sn, Bi, Te, S, In, or any combination thereof. In one embodiment, the N-type TE material comprises Bi$_2$Te$_{2.7}$Se$_{0.3}$ (BTS). In one embodiment, the at least one TE material comprises nanoscale particles and microscale particles, wherein at least 60% of the TE particles are 149 microns in size, or less. The solvent comprises a species selected from the group consisting of dimethyl sulfoxide, salicylic acid, acetic acid, deionized water, and any combination thereof. In one embodiment, the solvent comprises dimethyl sulfoxide (DMSO). In one embodiment, the amount of chitosan present in the TE ink is in a range from greater than zero to less than about 0.1 wt %, based on the total weight of the TE ink. In another embodiment, the amount of chitosan present in the TE ink is in a range from greater than zero to less than about 0.05 wt %, based on the total weight of the TE ink. In yet another embodiment, the amount of chitosan present in the TE ink is in a range from greater than zero to less than about 0.01 wt %, based on the total weight of the TE ink. In one embodiment, the curing temperature is less than about 150° C. and the time necessary to cure the TE film is in a range from about 5 minutes to about 30 minutes. In one embodiment, the at least one TE material comprises a heterogeneous size distribution of P-type or N-type TE particles and as such, after uniaxial pressure application, the smaller TE nanoparticles fill the voids between the larger TE microparticles. In one embodiment, the uniaxial pressure applied is in a range from about 150 to about 250 MPa. In one embodiment, the uniaxial pressure applied is in a range from about 180 to about 220 MPa. In one embodiment, the temperature of uniaxial pressure application is in a range from about 120° C. to about 150° C. In one embodiment, the time for uniaxial pressure application is in a range from about 15 minutes to about 45 minutes. The substrate can be flexible or rigid and can include material selected from the group consisting of polymer, foam, silicone, glass, woven textiles, unwoven textiles, a combination of polymer and textile, ceramic, KEVLAR, KAPTON, polyimide-laminate circuit-board materials, and any combination thereof. The method of making a thermoelectric composite film can further comprise coating the substrate with a coating material prior to application of the TE ink onto the substrate. In one embodiment, the coating material comprises chitosan. In one embodiment, the substrate comprises a flexible material such as KEVLAR with a coating of chitosan thereon. In another embodiment, the modified TE composite film has a ZT in a range of at least about 0.6 to 1.0. In still another embodiment, the TE composite film has a ZT in a range of at least about 0.7 to 1.0.

Notably, unlike the methods of the prior art, the method of the third aspect does not require curing/sintering at high temperatures (e.g., 250-450° C.) for long durations of time (e.g., 3-12 hours). Moreover, the binder is not removed using the method of the third aspect.

In a fourth aspect, a thermoelectric composite film is described herein, wherein the TE composite film comprises at least one thermoelectric material in a chitosan polymer binder. The amount of chitosan present in the TE ink is in a range from greater than zero to less than about 1 wt %, preferably in a range from greater than zero to less than about 0.1 wt %, based on the total weight of the TE ink. In one embodiment, the amount of chitosan present in the TE ink is in a range from greater than zero to less than about 0.05 wt %, based on the total weight of the TE ink. The TE composite film can be fabricated according to the method of the third aspect and as such comprises big TE material grains that are larger than the mean free path for charge carriers and TE material nano features smaller than the mean free path for phonon scattering, wherein the TE composite film comprises TE particle-chitosan polymer and TE particle-TE particle interfaces. The at least one TE material is defined hereinabove. In a preferred embodiment, the TE composite film is an efficient TE material having a high electrical conductivity, high Seebeck coefficient and low thermal conductivity. For example, in one embodiment, the TE composite film, after uniaxial pressure modification, has a figure of merit (ZT) in a range of at least about 0.5 to 1.0, more preferably in a range of at least about 0.6 to 1.0, and even more preferably in a range of at least about 0.7 to 1.0. Notably, the binder is present in the TE composite film of the fourth aspect (i.e., it was not removed or otherwise deteriorated by heat). In one embodiment, the TE composite film is on a substrate, as defined herein, with or without the uniform/smooth coating therebetween. In one embodiment, the TE composite film is free-standing.

Accordingly, the fourth aspect relates to a thermoelectric (TE) composite film comprising at least one modified thermoelectric material in a chitosan polymer binder, wherein the amount of chitosan present in the TE composite film is in a range from greater than zero to less than about 1 wt %, based on the total weight of the TE ink. In one embodiment, the amount of chitosan present in the TE composite film is in a range from greater than zero to less than about 0.1 wt %, based on the total weight of the TE ink. In another embodiment, the amount of chitosan present in the TE composite film is in a range from greater than zero to less than about 0.05 wt %, based on the total weight of the TE ink. In yet another embodiment, the amount of chitosan present in the TE ink is in a range from greater than zero to less than about 0.01 wt %, based on the total weight of the TE ink. In one embodiment, the TE composite film comprises TE particle-chitosan polymer and TE particle-TE particle interfaces. The TE composite film can be P-type or N-type. In one embodiment, the TE composite film comprises bismuth and telluride. In one embodiment, the TE composite film is P-type and comprises a bismuth-telluride (Bi—Te)-base and further includes at least one of Sb, Ni, Al, Cu, Ag, Pb, B, Ga, Bi, Te, Zn, S, Si, Se, Fe, Cr, Cd, Sn, Ge, Ca, In, or any combination thereof. In one embodiment, the TE composite film is P-type and comprises $Bi_{0.5}Sb_{1.5}Te_3$ (BST). In one embodiment, the TE composite film is N-type and comprises a bismuth-telluride (Bi—Te)-base and further includes at least one of Se, Ni, Al, Cu, Ag, Pb, B, Ga, Mg, Si, Sn, Bi, Te, S, In, or any combination thereof. In one embodiment, the TE composite film is N-type and comprises $Bi_2Te_{2.7}Se_{0.3}$ (BTS). In one embodiment, the TE composite film is an efficient TE material having a high electrical conductivity, high Seebeck coefficient and low thermal conductivity. In one embodiment, the TE composite film has a figure of merit (ZT) in a range of at least about 0.5 to 1.0, more preferably in a range of at least about 0.6 to 1.0, and even more preferably in a range of at least about 0.7 to 1.0. In one embodiment, the TE composite film was modified by application of uniaxial pressure.

In a fifth aspect, a thermoelectric generator (TEG) comprising at least one of the thermoelectric composite films described herein, arranged as a thermoelement, is disclosed. The performance of a TEG device depends on the thermoelectric (TE) properties (electrical conductivity, Seebeck coefficient, and thermal conductivity) of the TE materials (also known as ZT) and on the TEG device design (device dimensions and number of thermoelements). Efficient TE materials preferably have high electrical conductivity, high Seebeck coefficient and low thermal conductivity. The high electrical conductivity of TE materials provides high current, the high Seebeck coefficient provides high voltage, and low thermal conductivity provides a high temperature difference across the TEG device. The high aspect ratio (length to width ratio) of the TEG device also plays a role in maintaining a high temperature difference across the device, which will thereby result in a high voltage output (Madan (2015)). Similarly, if a high number of N- and P-type thermoelements (together known as couples) can be packed in a small area of the TEG device, it will also result in high voltage and high-power output. Preferably, to obtain the high power output of the TEG device, materials with high ZT, high aspect ratio (length to width ratio) of thermoelements, and a large number of couples, are used (Glatz (2006), Park (2016)).

A TEG of the fifth aspect can comprise at least one TE composite film, as described herein. In other words, the N-type thermoelements of the TEG can comprise a TE composite film described herein, or P-type thermoelements of the TEG can comprise a TE composite film described herein, or both the N- and P-type thermoelements of the TEG comprise a TE composite film described herein. The TEG can be flexible or rigid. The thermoelements can be applied to the substrate using drop-casting or screen-printing. The TEG can further comprise at least one metal electrode, as readily understood by the person skilled in the art.

Accordingly, the fifth aspect relates to a thermoelectric generator (TEG) comprising N-type and P-type thermoelements, wherein at least one thermoelement comprises a thermoelectric (TE) composite film as described herein, wherein the TE composite film comprises at least one modified thermoelectric material in a chitosan polymer binder, wherein the amount of chitosan present in the TE composite film is in a range from greater than zero to less than about 1 wt %, based on the total weight of the TE ink. In one embodiment, the amount of chitosan present in the TE composite film is in a range from greater than zero to less than about 0.1 wt %, based on the total weight of the TE ink. In another embodiment, the amount of chitosan present in the TE composite film is in a range from greater than zero to less than about 0.05 wt %, based on the total weight of the TE ink. In yet another embodiment, the amount of chitosan present in the TE ink is in a range from greater than zero to less than about 0.01 wt %, based on the total weight of the TE ink. In one embodiment, the TE composite film comprises TE particle-chitosan polymer and TE particle-TE particle interfaces. The TE composite film can be P-type or N-type. In one embodiment, the TE composite film comprises bismuth and telluride. In one embodiment, the TE composite film is P-type and comprises a bismuth-telluride (Bi—Te)-base and further includes at least one of Sb, Ni, Al, Cu, Ag, Pb, B, Ga, Bi, Te, Zn, S, Si, Se, Fe, Cr, Cd, Sn, Ge, Ca, In, or any combination thereof. In one embodiment, the TE composite film is P-type and comprises $Bi_{0.5}Sb_{1.5}Te_3$ (BST). In one embodiment, the TE composite film is N-type and comprises a bismuth-telluride (Bi—Te)-base and further includes at least one of Se, Ni, Al, Cu, Ag, Pb, B, Ga, Mg, Si, Sn, Bi, Te, S, In, or any combination thereof. In one embodiment, the TE composite film is N-type and comprises $Bi_2Te_{2.7}Se_{0.3}$ (BTS). In one embodiment, the TE composite film is an efficient TE material having a high electrical conductivity, high Seebeck coefficient and low thermal conductivity. In one embodiment, the TE composite film has a figure of merit (ZT) in a range of at least about 0.5 to 1.0, more preferably in a range of at least about 0.6 to 1.0, and even more preferably in a range of at least about 0.7 to 1.0. In one embodiment, at least one thermoelement is applied using drop-casting. In one embodiment, at least one thermoelement is applied using screen-printing.

In summary, the present invention relates to an inexpensive and energy-efficient method of fabricating flexible, printable TEGs, eliminating the need for an energy-intensive (long-duration and high-temperature) curing process to increase the mean free path for charge carriers. An energy-efficient approach combines: (1) a small amount of naturally occurring binder (<1 wt %) sufficient to hold the TE particles together in the film without significantly decreasing the electrical conductivity; (2) the heterogeneous distribution of particle sizes (a unique combination of micro and nanoparticles) packed very well; (3) the application of uniaxial pressure to modified the thermoelectric materials; and (4) low curing temperatures (<150° C.) and short durations (30 min) to yield grains larger than the mean free path for charge carriers (high electrical conductivity), and nano features smaller than the mean free path for phonon scattering (low thermal conductivity).

The TEG devices described herein can be incorporated into an article. In some aspects, the article can be a cushion, mattress, personal portable devices, wearable medical devices, a garment (including but not limited to an inner garment (e.g., shirt, underwear, base layers etc.), outer garment (e.g., jackets, pants, sweaters (outer shirts), hats, gloves, etc.), shoes and shoe liners, carpets, flexible wraps for use on a subject (e.g., bandages, support wraps), flexible wraps that can be used on an inanimate object (e.g., a wrap for a beverage container, lining of a cooler or bag, etc.).

The features and advantages of the invention are more fully illustrated by the following non-limiting examples, wherein all parts and percentages are by weight, unless otherwise expressly stated.

Example 1

Experimental

Two different BTS powders of 100 mesh and 325 mesh particles (Wuhan Dongxin Inc.) were purchased and used without further purification and grinding. Chitosan (MP Biomedicals, LLC) and dimethyl sulfoxide (DMSO, 99.7+ %, extra dry, ACROS Organics) were purchased and used as received. To prepare a chitosan binder, 150 mg of chitosan powder was added to 15 ml of DMSO and 98.4 mg of salicylic acid. (Fisher scientific, >99%) resulting in a 15 ml blend which was mixed using a vortex mixer. The binder solution was then placed on a magnetically stirring hot plate at 75° C., at 300 rpm overnight for complete dissolution. Following that, the chitosan binder was mixed with the BTS particles, and thermoelectric (TE) inks were prepared having binder-to-particle weight ratios of 1:2000 and 1:5000 (volume fraction of active particles was 98% and 99%) using both the 100 and 325 mesh BTS particles. The 100-mesh size means that the particles were filtered using a sieve with 149-micron openings and the 325-mesh size means that the particles have been filtered using a sieve with 44-micron openings. Thus, a total of four different TE inks were synthesized. An additional amount of DMSO solvent was added to attain proper viscosity of the TE inks and the inks were mixed using the vortex mixer for 1 min. In order to obtain TE ink with homogeneously dispersed particles, the synthetic ink was sonicated for 30 minutes in an ultrasonic bath. Before the deposition of ink on a substrate, the ink was mixed in the vortex mixer for 15 seconds again.

Chitosan-coated Kevlar (Fibre-Glast Development Corp., KEVLAR Plain Weave Fabric) was employed as the substrate for this experiment. A chitosan coating treatment was performed to the Kevlar to achieve more uniform films. The chitosan coating also prevented the infiltration of thermoelectric inks into the substrate, thus resulting in a more uniform TE film thickness (Jang (2019)). A diluted chitosan solution was obtained by mixing 0.1M of acetic acid (Fisher Chemical, >99.7 w/w %) and 150 mg of chitosan to 15 ml of deionized (DI) water followed by stirring magnetically (300 rpm) on a hot plate (75° C.) overnight. The chitosan solution was then applied on the Kevlar substrate and left to dry overnight, resulting in chitosan-coated Kevlar. The TE inks were drop casted onto the chitosan-coated Kevlar substrates so that the diameter of deposited ink film was approximately 5 to 7 mm. The TE inks deposited on the substrate were cured at 120° C. for 10 min until the solvent was completely evaporated. Then, the dried TE films were subjected to 150 and 200 MPa of pressure for 5 min in a hydraulic press (MTI corp., YLJ-CSP-30). The application of uniaxial pressure on the TE films resulted in uniform and smooth thickness. Weight ratios (1:2000 and 1:5000), applied pressure (150 MPa, 200 MPa), and particle size (100 mesh and 325 mesh) ultimately resulted in a smooth film without delamination.

All measurements were performed in ambient air. To minimize errors, multiple readings were taken on eight or more individual TE films from the same ink and are shown in FIGS. 1A-1F. The Hall Effect measurement system (ECOPIA, HMS-5500) was employed in to measure the electrical conductivity and charge carrier concentration. Before measuring the electrical conductivity, a micrometer (Mityutoyo, 293-340-30) was used to measure the thickness of the sample. The thickness readings were performed multiple times and at different locations on the films and the average value of these readings was considered. The thickness of the TE film was determined to be about 200~300 μm by subtracting the thickness of substrate from the thickness of the whole article comprising the TE film and chitosan-coated substrate.

The Seebeck coefficient was measured using a custom-built Seebeck measuring system. The temperature difference (approximately 0K, 2K, 4K, and 6K) in the sample was generated by two peltiers. The two thermocouples were located on each side of the sample and measured the temperature of the sample. A holding time of 65 seconds was provided to stabilize the temperature difference on each peltier followed by the voltage output measurement using gold tip probes. A total of 50 readings for both the temperature and voltage were recorded to minimize error in the measurement. A MATLAB program then plotted a linear equation graph with the slope of the voltage differences ($\Delta V$) over the temperature differences ($\Delta T$) and the Seebeck coefficient, which is the slope of the equation, was obtained. The Seebeck coefficient for Ni foil, determined to be $-24$ μV/K, was also calculated for calibration purposes. To obtain the absolute Seebeck coefficient of Ni, the Seebeck coefficient of Cu wires was subtracted from the measured Seebeck coefficient values of Ni foil, yielding an absolute Seebeck coefficient value of the Ni foil of $-22$ μV/K, which is within 10% of reported $-20$ μV/K (Schrade (2014), Abadlia (2014) and Burkov (2001)).

Thermal conductivity was measured by using a TCi thermal conductivity analyzer (C-Therm Technologies Ltd.). To make an appropriate size (diameter: larger than 20 mm, thickness: about 1 mm) of the TE films, the TE ink was dried in an oven (30 min at 120° C.) and transferred onto a metal mold. The transferred composite powder was compressed to 200 MPa and the desired size and geometry of TE film was obtained. The Modified Transient Plane Source (MTPS) sensor was covered with thermal grease for the complete contact and the TE film was placed on the sensor. Notably, the BTS 100-mesh and BTS 325-mesh films used for thermal conductivity measurements were not mounted on a Kevlar substrate. Instead, free-standing disc-shaped films of thickness around 1 mm were used. As recommended in the TCI thermal conductivity analyzer manual for measurement of samples with less than 5 mm thickness, a silicone blotter (also provided by C-Therm Technologies Ltd) was used under the film. As described in the manual, the thermal conductivity of the silicone blotter is 0.061 W/mK (which is one order of magnitude lower than the measured thermal conductivity for films). Therefore, the error in the thermal conductivity measurements is not significant. By applying current to the sensor and measuring the voltage with increasing temperature, the thermal diffusivity and thermal conductivity of the sample was obtained relative to the resistance of the sample.

The density of the TE film was calculated by dividing the volume of the film by weight. The weight of the TE films was measured with a weighing balance (SARTORIUS, TE214S Analytical Balance) and the volume of the TE films was measured with a 3D laser scanning microscope (KEYENCE, VX-X1000). To reduce the error margin, multiple TE films were prepared from the same TE ink and the volume and the weight were measured. The density values reported in this study are an average of these multiple measurements.

Results and Discussion

FIG. 1A shows the electrical conductivity of chitosan-BTS TE composite films at two different binder-to-particle weight ratios (1:2000 and 1:5000) at two different pressures (150 MPa and 200 MPa) and two different grain sizes (100 mesh and 325 mesh). The average electrical conductivity for the N-type 100 mesh BTS composite films with 1:2000 binder-to-particle weight ratio pressed at a uniaxial pressure of 150 MPa and 200 MPa was 179 Scm$^{-1}$ and 200 Scm$^{-1}$, respectively. The conductivity values for the 100 mesh films with a binder-to-particle weight ratio of 1:5000 pressed at 150 MPa and 200 MPa pressure was 174 Scm$^{-1}$ and 187 Scm$^{-1}$, respectively. The electrical conductivity of BTS 100 and BTS 325 mesh composite films were less than BTS bulk samples (800 S/cm) (Yan (2010)). The carrier concentration for BTS 100 and BTS 325 mesh is same as the bulk value (Jiang (2005)). In order to understand what is contributing to the lower electrical conductivity for the composite films, carrier mobility measurements were performed. Referring to FIG. 1D, it can be seen that the carrier concentration is almost the same as the bulk value. That said, as seen in FIG. 1C, the carrier mobility is lower by an order of magnitude (29-34 cm$^2$/V-s for 100-mesh films and 10-15 cm$^2$/V-s for 325-mesh films compared to 894 cm$^2$/V-s for bulk), which likely contributes to the lower electrical conductivity for the composite films. Without being bound by theory, it is thought that this low charge carrier mobility can be attributed to grain boundaries, interfaces, and a small amount of chitosan binder present in the composite film.

It can be said that on increasing the applied pressure from 150 MPa to 200 MPa for 1:2000 and 1:5000 BTS TE composite films, the electrical conductivity did not change much. This is thought to be due to percolation phenomenon for composite materials. Any composite films comprise of two phases—a conductive filler phase and an insulating dispersive phase. According to the percolation theory of composites, when the conductive filler is gradually increased in the composite matrix, the composite starts undergoing an insulator to conductor transition. The critical filler content is referred to as the percolation threshold, where the measured electrical conductivity of the composite sharply jumps up several orders of magnitude due to the formation of continuous electron paths or conducting network (Celzard (2002), Mamunya (2002)). A similar phenomenon was observed in this n-type chitosan-BTS TE composite film study where the conductive phase was the active TE BTS particles and the chitosan binder acted as the dispersive phase. The electrical conductivity increased significantly when the binder-to-particle weight ratio was increased, and it reached a percolation threshold at 1:2000 (Jang (2019)). However, once it crossed the percolation threshold limit, the increase in electrical conductivity took place steadily (Jang (2019), Celzard (2002), Mamunya (2002)). Therefore, the electrical conductivity values of the chitosan-BTS TE composite films for a binder-to-particle weight ratio of 1:2000 and 1:5000 were approximately the same. In conclusion, neither an increase in the binder-to-particle weight ratio from 1:2000 to 1:5000, nor the applied pressure from 150 MPa to 200 MPa resulted in increasing electrical conductivity.

The electrical conductivity for 325 mesh chitosan-BTS TE composite films with a binder-to-particle weight ratio of 1:2000 and 1:5000 pressed at 150 MPa was 88 Scm$^{-1}$ and 85 Scm$^{-1}$, respectively, and pressed at 200 MPa was 92 Scm$^{-1}$ and 90 Scm$^{-1}$, respectively, as shown in FIG. 1A. It is presumed that the electrical conductivity is approximately the same for both 1:2000 and 1:5000 binder-to-particle weight ratios due to the percolation phenomenon as explained above. Additionally, the electrical conductivity did not change much due to different applied pressures.

It was observed that the electrical conductivity for the 100 mesh chitosan-BTS TE composite films was higher than the 325 mesh films. This likely occurs due to a combined effect of the wide grain-size distribution and the applied mechanical pressure on TE composite films. SEM characterization was performed to determine the range of grain-size distribution in both 100 mesh and 325 mesh TE particles as shown in FIGS. 2A-2B. The approximate number of particles for each grain-size was plotted using ImageJ as shown in FIGS. 3A-3B. The ImageJ software used generated the particle-size distribution counts from the SEM images.

For the 100 mesh BTS TE particles as shown in FIGS. 2A and 3A, both fine and coarse particles were observed. On the other hand, reviewing FIGS. 2B and 3B, the 325-mesh BTS TE particles comprised only finer particles. Interestingly, the coarse-looking particles in FIG. 2B particles are actually fine particles that have aggregated.

At least two factors that will affect the electrical conductivity of a TE composite film; grain-size and applied pressure. FIGS. 3A and 3B show that the 100 mesh BTS TE film has a wide range of particles with sizes ranging from ~20 um to ~220 um, while the 325 mesh BTS TE film has a narrower particle size range from ~20 um to ~100 um. Additionally, the 325 mesh TE composite films particle size is mainly concentrated at ~20 um (450 particles) to ~40 um (175 particles), while 100 mesh film has only 190 particles at ~20 um and 110 particles at ~40 um. Accordingly, the 100 mesh films for a fixed area have less number of particles as compared to 325 mesh composite films; larger particles can fill the area with relatively less number of particles as smaller particles. Therefore, 100 mesh TE composite films with same area and same weight ratio have less grain boundaries as compared to 325 mesh composite films, which will cause less boundary scattering and therefore, an increase the electrical conductivity (Kishimoto (2002), Zhao (2009), Fan (2010)). After applying external pressure on the 100 mesh N-type TE composite films, small and big particles will substantially coalesce. Therefore, 100-mesh films will form a substantially plate-like structure. The plate-like structure in the chitosan-100 mesh BTS TE composite film facilitates the charge carriers to flow smoothly with minimal or negligible grain boundary scattering which will result in high electrical conductivity for the 100-mesh films (Fan (2010)).

To verify this hypothesis, Scanning Electron Microscopic (SEM) analysis was performed on the 100 mesh and 325 mesh N-type composite films. FIGS. 4A-4C show the cross-sectional images of the 100 mesh TE composite films after applying 200 MPa pressure. It is evident from these images that the 100-mesh film forms a plate-like polycrystalline structure film. FIGS. 4D-4F show SEM images of 325 mesh TE composite films after applying 200 MPa pressure. Without being bound by theory, it is believed that because the 100 mesh composite film has a wide range of particle sizes, the smaller particles may insert into the gap between larger particles and fill the gaps on the application of pressure. In contrast, the 325-mesh film did not form a plate-like structure because of the fine and uniform particle distribution; the smaller particles will form smaller gaps, which cannot be filled easily. As a result, the 100 mesh films' natural packing structure is generally more compact than the 325 mesh films. Notably, while the 325-mesh films have only fine particles, under the application of external pressure they will also coalesce. However, as shown in FIGS. 4D-4F, the 325 mesh TE composite films have lots of grain boundaries. These grain boundaries will result in potential barrier scattering sites and result in lower electrical conductivity as compared to 100 mesh TE composite films (Zhao (2009)).

The density of 100 mesh and 325 mesh TE composite films was also measured as shown in Table 1. The density value for the 100 mesh films was determined to be 6.08 g/cm$^3$, approximately 83% of the bulk packing density, 7.28 g/cm$^3$ (Liu (2018)). However, the packing density value for the 325 mesh films was determined to be 4.94 g/cm$^3$, approximately 68% of the bulk packing density. The higher packing density in 100 mesh films, having less pores and voids, results in less grain boundary scattering which leads to better electrical connection between the grains thereby increasing the conductivity (Gharleghi (2016)).

TABLE 1

Sample and bulk density of composite chitosan-TE films

| TE-chitosan composite films | Sample density (g/cm$^3$) | | Bulk density (g/cm$^3$) |
|---|---|---|---|
| | 100 mesh | 325 mesh | |
| $Bi_2Te_{2.7}Se_{0.3}$ | 6.08 | 4.94 | 7.6 (Liu (2018)) |

The highest electrical conductivity value for the 100 mesh chitosan-BTS TE composite films pressed at 200 MPa was 202 Scm$^{-1}$ whereas the electrical conductivity value of the bulk material was 700-800 Scm$^{-1}$ (Yan (2010)). This reduction in electrical conductivity is likely due to two main factors-insulating binder and the N-type materials' oxidation. The chitosan-based binder is an insulating polymer, so when combined with a highly conductive TE material like BTS, it reduces the overall conductivity of the TE composite material (Madan (2012a)). Additionally, BTS particles are N-type materials, and empirical studies have proved that the N-type semiconductor materials are more likely to oxidize (Lee (2018), Li (2011)). The oxidation of N-type particles drastically reduces the electrical conductivity of the N-type chitosan-BTS TE composite film. Some oxidation is expected in this example since ink synthesis and films characterization was performed in an open atmosphere.

Figure 1B:
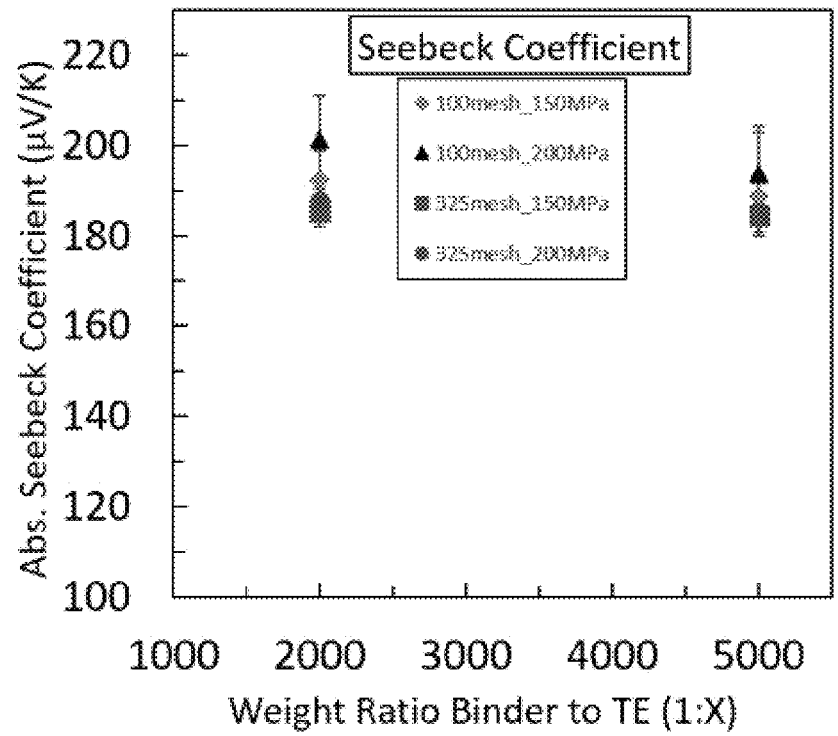
FIG. 1B shows the results of Seebeck coefficients for chitosan-BTS composite films at room temperature.
Figure 1C:
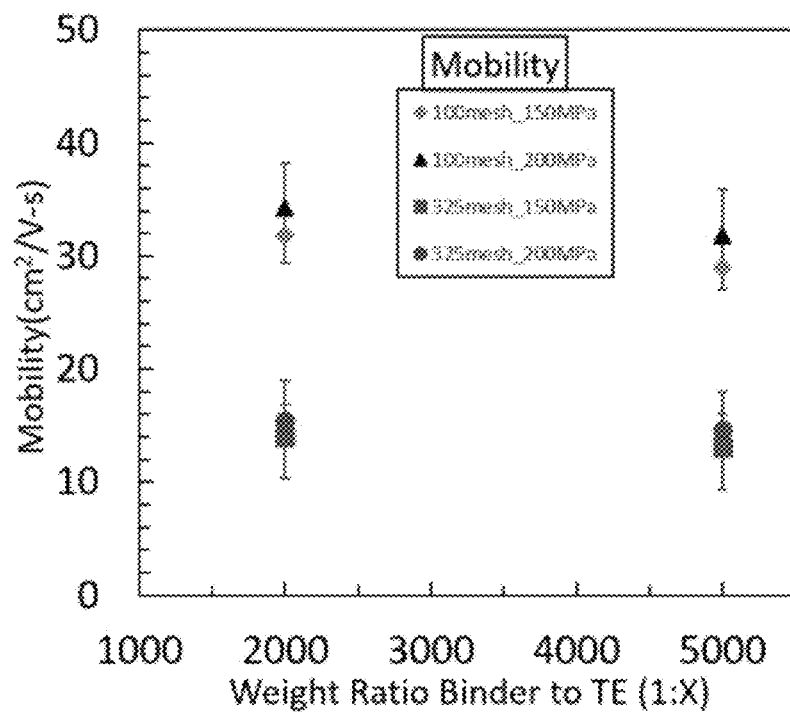
FIG. 1C shows the results of the mobility study for chitosan-BTS composite films at room temperature.
Figure 1D:
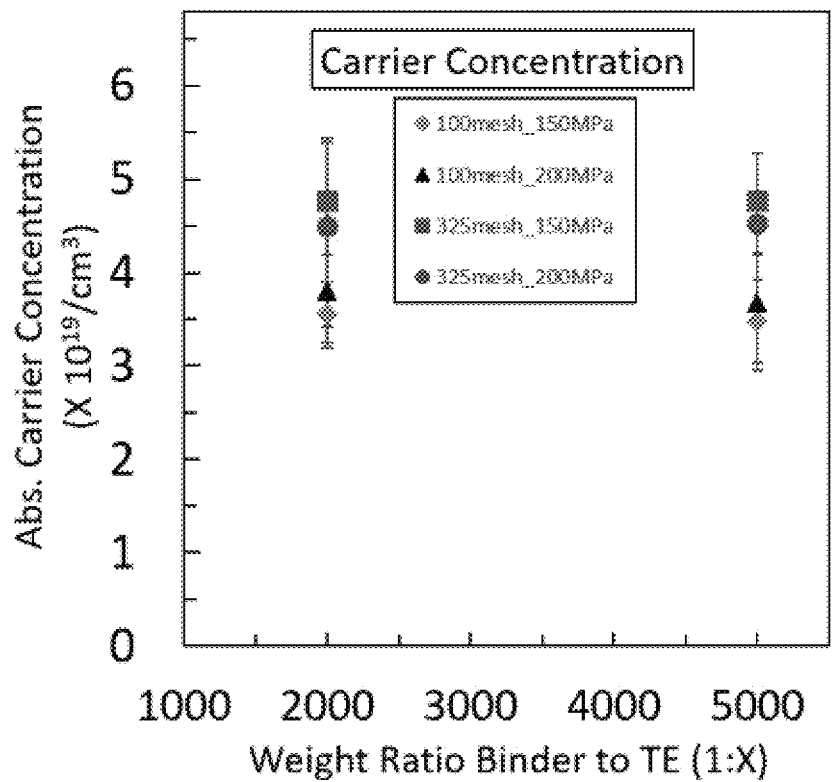
FIG. 1D shows the results of the carrier concentration study for chitosan-BTS composite films at room temperature.
Figure 1E:
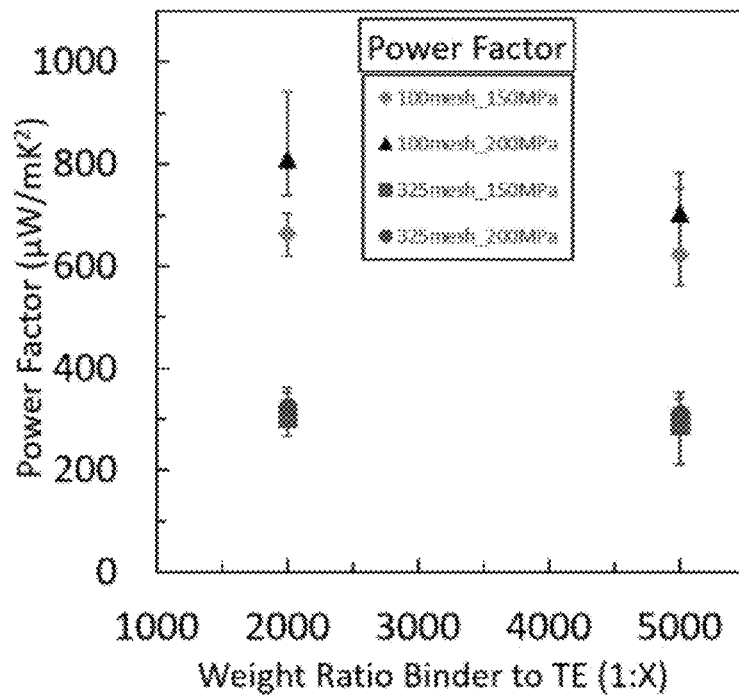
FIG. 1E shows the results of the power factor study for chitosan-BTS composite films.
Figure 1F:
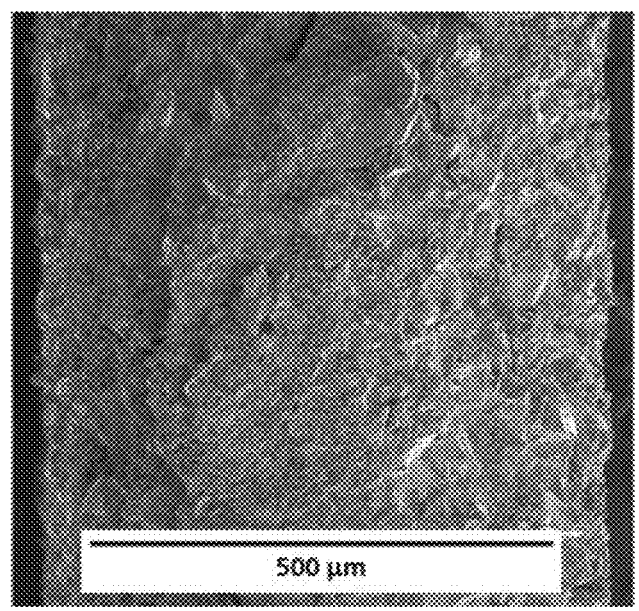
FIG. 1F is a cross-sectional view of a BTS 100-mesh 1:2000 weight ratio film pressed at 200 MPa.

FIGS. 1B and 1C shows the results of Seebeck coefficients and carrier concentration for chitosan-BTS composite films, respectively. From FIG. 1B, the average Seebeck coefficient for the 100 mesh BTS-chitosan composite films with a 1:2000 binder-to-particle weight ratio pressed at 150 MPa and 200 MPa uniaxial pressure was −193 μVK$^{-1}$ and −202 μVK$^{-1}$, respectively. The average Seebeck coefficient for the 100 mesh BTS films with a 1:5000 binder-to-particle weight ratio at 150 MPa and 200 MPa was −189 μVK$^{-1}$ and −194 μVK$^{-1}$, respectively. The average Seebeck coefficient for the 325 mesh BTS films with a 1:2000 binder-to-particle weight ratio at 150 MPa and 200 MPa was −185 μVK$^{-1}$ and −188 μVK$^{-1}$, respectively, while the average Seebeck coefficient for the 325 mesh BTS films with a 1:5000 binder-to-particle weight ratio at 150 MPa and 200 MPa was −184 μVK$^{-1}$ and −185 μVK$^{-1}$, respectively. The results show that all the Seebeck coefficients are close to −200 μVK$^{-1}$. Therefore, FIG. 1B proves that the BTS films' Seebeck coefficients were not affected by any of the 3 factors, weight ratios of chitosan (1:2000 and 1:5000), the values of applied pressures (150 MPa and 200 MPa) or the particles size (100 and 325 mesh). The Seebeck coefficient of the bulk BTS is about −175 μVK$^{-1}$, which is quite close to chitosan N-type BTS TE composite films (Yan (2010)).

From FIG. 1C, a similar phenomenon was also observed for the carrier concentrations as the values were approximately the same for all the three factors mentioned above. Consequently, the results agreed with the conclusion that the Seebeck coefficient is a function of the carrier concentration (Ioffe (1957b)).

Table 2 below summarizes the thermoelectric properties for the chitosan-BTS composite films. The highest power factor for 100 mesh film was 808 μWm$^{-1}$K$^{-2}$, obtained from a weight ratio of 1:2000, pressed at 200 MPa, and the highest power factor for 325 mesh film was 301 μWm$^{-1}$K$^{-2}$, obtained from a weight ratio of 1:5000, pressed at 150 MPa. Since the Seebeck coefficients for all of the tested BTS films are substantially similar, the main contributor to the highest power factor value is the high electrical conductivity of the film. That said, the obtained power factors for the composite films are lower than the bulk BTS power factor, which is calculated to be ~2300 μWm$^{-1}$K$^{-2}$ (Yan (2010)), which may be attributed to the lower value of electrical conductivity achieved for both the 100 mesh and 325 mesh TE composite film as compared to the bulk BTS electrical conductivity of 700-800 Scm$^{-1}$.

TABLE 2

Electrical conductivity (σ), Seebeck coefficient (α), power factor (PF), thermal conductivity (κ) and figure of merit (ZT) for composite chitosan TE films at different wt. ratio and pressures

| Thermoelectric particles | Wt. ratio (binder:powder) | Pressure (MPa) | Particle mesh size | σ (Scm$^{-1}$) | α (μVK$^{-1}$) | PF (μWm$^{-1}$K$^{-2}$) | κ (Wm$^{-1}$K$^{-1}$) | ZT |
|---|---|---|---|---|---|---|---|---|
| Bi$_2$Te$_{2.7}$Se$_{0.3}$ | 1:2000 | 200 | 100 mesh | 200 | −201 | 808 | 0.60 | 0.40 |
| Bi$_2$Te$_{2.7}$Se$_{0.3}$ | 1:5000 | 150 | 325 mesh | 88 | −185 | 301.2 | 0.55 | 0.16 |

The thermal conductivity for 1:2000 wt. ratio BTS-100 mesh and BTS-325 mesh composite film was measured to be 0.6 Wm$^{-1}$K$^{-1}$ and 0.55 Wm$^{-1}$K$^{-1}$, respectively, which was lower than the bulk BTS thermal conductivity of 1.6 Wm$^{-1}$K$^{-1}$ (Yan (2010)). One explanation for the reduction of thermal conductivity is the effect of the insulating chitosan binder in the composite films. Such a phenomenon has also been reported by Madan (Madan (2012a), Madan (2011), Madan (2013)). The thermal conductivity of our TE composite films depends on the presence of insulating chitosan binder and TE particle sizes. The TE particle sizes range from nanometer to micron size as shown in the SEM image in FIG. 5. Moreover after the solvent evaporation there are many voids left in the composite films as shown in the SEM image in FIG. 5. The presence of insulating binder, nanometer TE particles, and nano-sized voids causes phonon scattering and reduces the thermal conductivity (Yan (2010), Takashiri (2008), Hicks (1993)). Moreover, it can be assumed that the interfacial thermal resistance is high because of the interfaces present among binder, voids, and TE particles as shown in FIG. 5 (Poudel (2008), Sahoo (2014)). High interfacial resistance also causes low thermal conductivity as reported by many researchers (Id.). Therefore, the thermal conductivity is low in BTS-chitosan composite films.

The ZT value of 0.4 for the chitosan BTS composite films with the highest power factor was also achieved at the room temperature, as shown in Table 2. This value is comparable to the ZT value (0.4-0.57) from other published literatures (Choi (2018), Choi (2017)).

In conclusion, the highest power factor of 808 μWm$^{-1}$K$^{-2}$ was achieved from the 100 mesh BTS film with a binder-to-particle weight ratio of 1:2000 pressed at 200 MPa, with an electrical conductivity of 200 Scm$^{-1}$ and the Seebeck coefficient of −201 μVK$^{-1}$. The thermal conductivity for this film was 0.6 Wm$^{-1}$K$^{-1}$, and the ZT was calculated to be 0.4 at room temperature. These results proved that DMSO dissolved chitosan could be a successful binder material for thermoelectric composite films. Its high viscosity and high temperature tolarence properties make chitosan the perfect candidate for fabricating BTS films. The heterogeneous grain sizes also played a significant role in improving the electrical conductivity of the BTS films, as the smaller particles can fill the gaps created by larger particles, thereby eliminating pores and voids. In addition, the use of coarse particles reduces the amount of grain boundary, thereby reducing the grain boundary scattering. The unique pressing method not only eliminated the high energy-intensive and time-consuming curing process for removing the solvent during film fabrication, but also helped increasing the film's electrical conductivity by increasing its packing density.

Overall, a nano-structuring approach, that decouples electron and phonon transport in the thermoelectric composite, was exploited. Nano-defects, nano-particles, and interfaces were introduced between large grains of active particles. This system scatters phonons and lowers the lattice thermal conductivity without significantly affecting the electron transport. Using this approach, thermal and electron transport properties can be controlled independently and a low value of thermal conductivity achieved.

Example 2

Figure 6A:
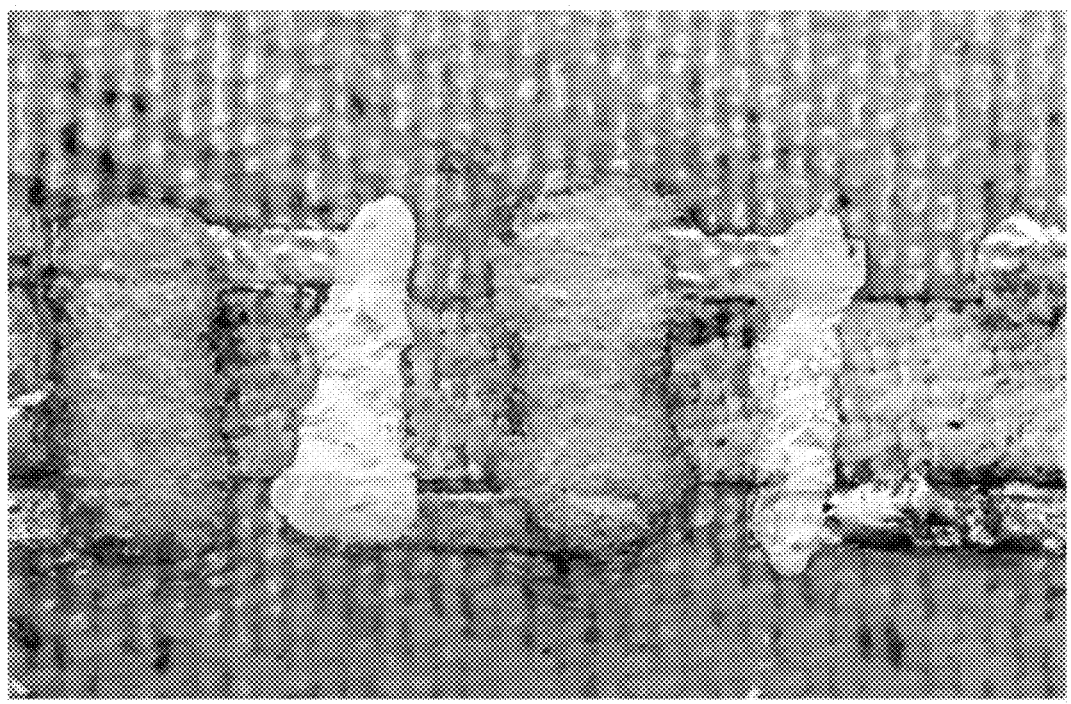
FIG. 6A shows a 2-leg N-type BTS device printed using stencil printing.

Using the best reported BTS 100 mesh inks, a 2-leg N-type BTS device was fabricated. The BTS device was printed on a gold coated electrode on a Kevlar substrate as shown in FIG. 6A. Stencil printing was used to print the thermoelectric generator (TEG) device. BTS inks were used for the N-type leg and Ag inks for the other leg. The device resistance ($R_{in}$) of the prototype was 9 ohms. The open-circuit voltage of the two single-leg BTS device was determined to be 4.2 mV at ΔT of 12 K. The electrical conductivity value was determined to be 200 S/cm.

Figure 6B:
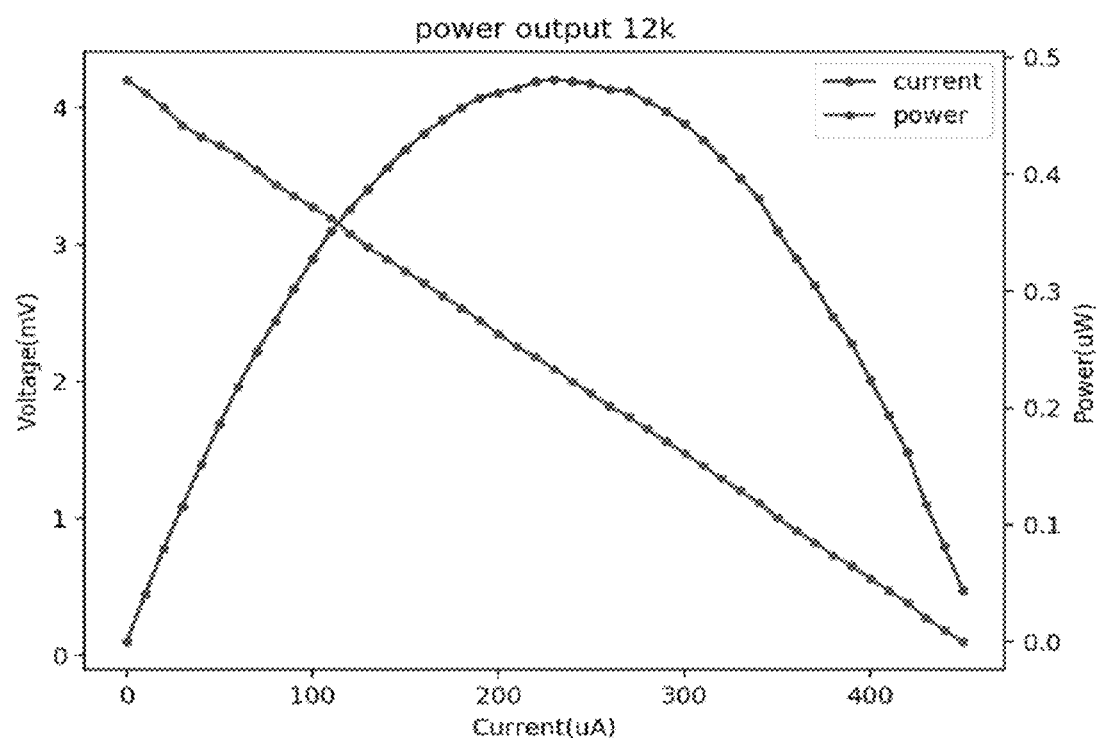
FIG. 6B shows the power characteristic curve of the TEG device of FIG. 6A at $\Delta T$ of 12 K.

FIG. 6B shows the power output characteristics of the two-leg BTS prototype at ΔT of 12 K. The maximum power was obtained when the device resistance matched the load resistance of 0.48 μW at closed circuit voltage of 2.28 my and ΔT of 12 K. The power output of this device is comparable to N-type BTS single leg device reported by Madan (Madan (2012a), Madan (2013)).

Example 3

Experimental

Commercially available 60-mesh and 325-mesh particles for P-type Sb$_2$Te$_3$ (Wuhan Xinrong Inc., China) and 100-mesh and 325-mesh particles for P-type Bi$_{0.5}$Sb$_{1.5}$Te$_3$ (BST) (Wuhan Dongxin Inc., China) were used. Chitosan (MP Biomedicals, LLC) and dimethyl sulfoxide (DMSO, 99.7+%, extra dry, ACROS Organics) were purchased from Fisher Scientific. In order to prepare the chitosan binder, 98.4 mg of salicylic acid powder was added to 15 ml of DMSO and mixed using a vortex mixer until the powder was completely dissolved without any visible particles. Next, the chitosan powder (150 mg) was added to the DMSO blend and mixed using a vortex mixer. For complete dissolution, the binder solution was placed on a hot plate with overnight magnetic stirring at 75° C. and 300 rpm overnight. Inks comprising various different weight ratios of chitosan binder to TE particles (1:500, 1:2000, 1:5000, and 1:7000) were prepared using both ST-60 mesh and ST-325 mesh and BST-100 mesh and BST-325 mesh as active particles. An additional amount of DMSO was added to attain the proper viscosity. The synthesized inks were then mixed using a vortex mixer for 1 minute and then sonicated in an ultrasonic bath for 30 minutes to attain homogeneity.

A Kevlar substrate (Fibre Glast Development Corp., KEVLAR® Plain Weave Fabric) was coated with a dilute chitosan solution to attain a more uniform surface of the substrate. Dilute chitosan solution was prepared by mixing 150 mg of chitosan and 0.1M of acetic acid to 15 ml of deionized (DI) water and magnetically stirred on a hot plate. The dilute chitosan solution was applied to the Kevlar substrate and dried overnight. The chitosan coated Kevlar substrate was heated in the oven for 5 minutes at 150° C. before being used as a substrate for drop casting the films. The inks were deposited onto these preheated chitosan coated Kevlar substrates such that the ink drop diameter was approximately 5 to 7 mm. These drop-cast inks on the substrate were cured at 120° C. for 5 minutes until the solvent was completely evaporated. The A fine particle BST-100 (1:2000) film was also screen-printed using screen printer (HMI MSP-485) and the film was not powdery or flaky. Therefore, it was concluded that a small amount (less than 0.1 wt. %) of chitosan was sufficient to hold the particles together in the composite film. The cured films were then pressed at a pressure of 200 MPa for 5 minutes with a Hydraulic press (MTI corp., YLJ-CSP-30). To avoid contamination and protect the TE films during the pressing, a polyethylene film was placed between the film and the pressing metal rod.

The hole concentration, electrical conductivity, mobility, and Seebeck coefficient for the thick films was measured in the in-plane direction. In order to measure the electrical conductivity and charge carrier concentration, the Hall Effect measurement system (ECOPIA, HMS-5500) was employed. All measurements were performed in ambient air, and multiple readings were carried out on at least four individual samples of the same ink and then error plots were used to show the data. Vernier calipers (Mityutoyo, 293-340-30) were used to measure the thickness of the sample. To minimize the thickness measurement error, an average of multiple (6 to 7) readings was considered. The film thickness (~200 μm) was obtained by calculating the difference between substrate thickness (~250 μm) and the total thickness of the substrate and film (~450 μm). Rectangular screen-printed films with an area of 35 mm² (7 mm×5 mm) and a thickness between 180-200 microns were used for electrical conductivity and Seebeck coefficient measurements A custom-built Seebeck measurement setup was used to measure the Seebeck coefficient. Two peltiers were used to generate temperature differences (0K, 2K, 4K, and 6K) across the sample by enforcing various voltages (0V, 0.7V, 1.4V, and 2.1 V) to the peltiers. A time of 65 seconds was used to stabilize the temperature of peltiers and films after each measurement. A gold tip probe and a thermocouple were used on each of the ends of the sample to measure the voltage differences ($\Delta V$) and the temperature differences ($\Delta T$), respectively, across the sample. Multiple measurements (50 times at each different temperature stage) of both voltages and temperatures were recorded to minimize the error. The Seebeck coefficient was then calculated as the slope of the $\Delta T$ (x-axis) and the $\Delta V$ (y-axis) straight line. A standard Ni sample was used to calibrate our measurement setup. The Seebeck coefficient for the sample as measured on this setup was −20-21 μV/K which, is comparable to values reported in Burkov (2001) and Abadlia (2014) at room temperature.

The thermal conductivity was measured along the direction of pressure or the out-of-plane direction using the TCi thermal conductivity analyzer (C-Therm Technologies Ltd.) since thick composite films comprising randomly oriented ST/BST particles were printed.

For thermal conductivity measurement, the sample should have a diameter of 2.5 cm and a thickness of 1.5 mm so that it can cover the whole sensor while maintaining good contact with the sensor. In order to make a sufficiently large and thick free-standing chitosan TE composite fils, the chitosan-TE inks were dried in an oven at 130° C. for 30 minutes. The dried inks were placed in close contact with the pressing rod and pressed at 200 MPa to obtain the desired sample geometry and thickness. The free-standing composite film was coated with thermal grease and placed on the MTPS sensor. The blotter method was executed using a silicon pad to measure thermal conductivity at room temperature, wherein on top of the free-standing film, a silicon pad was placed followed by 500 gm of weight. The current was forced to the sensor, and the increase in temperature was measured by the sensor in terms of voltage, thermal diffusivity, and thermal conductivity.

The density of the TE films was calculated based on the total weight of composite films and volume. The weight of the chitosan-TE composite films was measured with a weighing balance (SARTORIUS, TE214S Analytical Balance), and the volume of the TE films was measured with a 3D laser scanning microscope (KEYENCE, VX-X1000) (Jang (2020)). The density was calculated by dividing the measured weight by the measured volume. Multiple density measurements were conducted, and the average value is reported in this study to reduce the error margin.

Results and Discussion

To study the grain size effect on TE composite films, commercially available P-type ST-60 and ST-325 mesh particles was used. FIGS. 7A and 7B show the SEM image of ST-60 mesh and ST-325 mesh particles, respectively. The particle size distribution for 60-mesh and 325-mesh ST particles using SEM images and the ImageJ software (an open source image processing program for scientific image analysis) was analyzed. FIGS. 8A and 8B shows an approximate value of the number of particles for the 60-mesh and 325 ST particle size, respectively. The standard "60-mesh size" means that the particles were filtered using a sieve of 250-micron opening. A filtering from 250-micron opening ensures almost all the particles were smaller than 250 microns. Note, a filtering from 250-micron opening does not guarantee that all particles will be smaller than 250 microns, because particles can be of various 3D shapes (e.g., cylindrical, cones, elliptical, prism, etc.). Therefore, as can be seen in FIGS. 7A and 8A, although almost all the particles for the 60-mesh sample are smaller than 250 microns, there are a small number of larger particles as well. These larger particles facilitate charge carriers' larger mean free path and contribute to high charge carrier mobility and electrical conductivity. As expected, the 325-mesh are mostly 44 microns and smaller although it is expected that some of these particles will be larger than 44 microns (see, e.g., FIGS. 7B and 8B).

The TE properties (electrical conductivity and Seebeck coefficient) of P-type chitosan ST (60 mesh and 325 mesh) TE composite films were characterized for various binder-to-particle weight ratios (1:500, 1:2000, 1:5000, and 1:7000) at room temperature. Similarly, the electrical conductivity and the Seebeck coefficient of chitosan-BST (100 and 325 mesh particles) TE composite films were studied for the same binder-to-particle weight ratios (1:500, 1:2000, 1:5000, and 1:7000) at room temperature. FIGS. 9A-9E shows the electrical conductivity, Seebeck coefficient, charge carrier concentration, mobility, and power factor, respectively, of different TE-composite films with respect to weight ratios of binder to TE particles for different particle sizes.

The TE-chitosan composite films are composed of the conductive phase (active P-type TE particles) and the dispersion phase (insulating chitosan binder). According to the percolation theory of a composite system, when the P-type phase (ST/BST particles) reaches the percolation threshold, the electrical conductivity increases drastically due to the formation of continuous charge transport paths inside the chitosan binder in composites. However, once the TE particles attained a percolation threshold, that is, when the binder-to-particle ratio of 1:500 was achieved, increasing the amount of conductive TE particles in the chitosan-TE composite film did not result in a remarkable increase in electrical conductivity (Mamunya (2002), Gharleghi (2016)). Accordingly, referring to FIG. 9A, the electrical conductivity did not show much variation by changing the weight ratios (1:500, 1:2000, 1:5000, and 1:7000) for all four different particle sizes (ST-60 and ST-325 mesh, BST-100 and BST-325 mesh). The highest value of electrical conductivity was observed for 1:2000 binder to particles (ST and BST) for different particle sizes (60, 100, and 325 mesh).

Figure 9A:
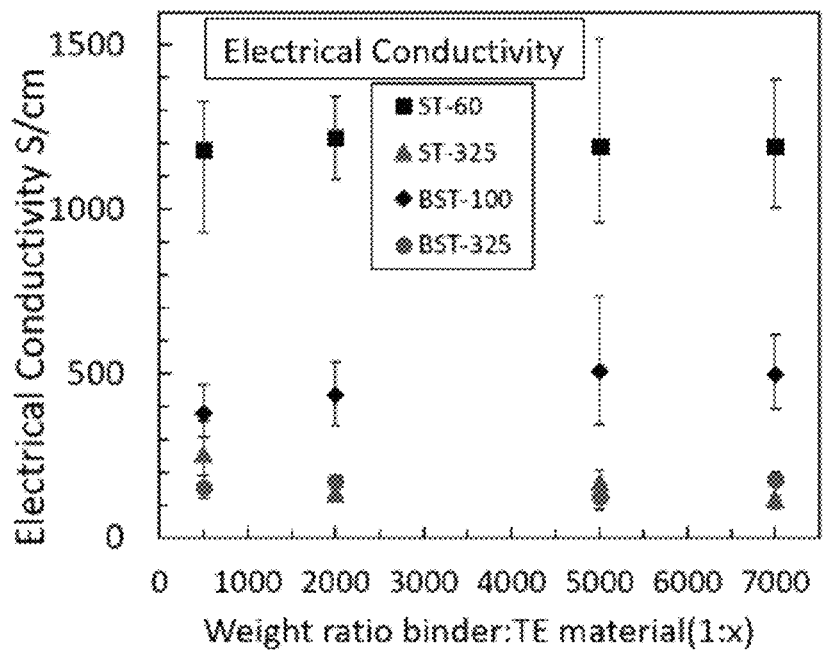
FIG. 9A shows the electrical conductivity of composite chitosan TE P-type films based on different material (ST and BST), ST particle mesh size (60 mesh and 325 mesh), BST (100 mesh and 325 mesh) and the weight ratio of chitosan binder to TE material (1:500, 1:2000, 1:5000, 1:7000).

For the chitosan-ST60 composite (1:2000) films, the average value of the electrical conductivity was about 1300 S/cm at a pressure of 200 MPa and is comparable to bulk $Sb_2Te_3$ (1667 S/cm) as shown in FIG. 9A (Cao (2016)). Moreover, the average value of the Seebeck coefficient for these films was 96 µV/K and the corresponding carrier concentration value was $13 \times 10^{19}/cm^3$. The average power factor for chitosan-ST-60 composite film was about 1200 µW/mK$^2$. The chitosan-ST-325 composite films (1:2000) reported an average electrical conductivity value of 130 S/cm. The Seebeck coefficient was about 91 µV/K thus resulting in a power factor of 109 µW/mK$^2$ for the 1:2000 films. The corresponding carrier concentration was $14 \times 10^{19}/cm^3$. After comparing the two different mesh sizes of ST composite films, it was evident that ST-60 TE composite films reported a higher electrical conductivity and a higher power factor relative to the ST-325 films. Without being bound by theory, the high electrical conductivity value of chitosan-ST-60 TE composite films can be attributed to two major factors: mixed distribution of particle size and applied pressure. ST-60-mesh particles have a wide range of particle distribution (submicron to 500 µm), which was a combination of fine and coarse particles as shown in FIGS. 7A and 8A. However, on the other side, ST-325 films have a particle distribution from submicron to 100 µm as shown in FIGS. 7C and 8C. Therefore, for the same weight ratio and same unit area comparison (1:2000), ST-60 composite films have a combination of large and small particles, and therefore less grain boundaries relative to ST-325 TE composite films. Moreover, to understand the combined effect of grain-size and applied pressure on the TE composite films SEM was performed. FIGS. 10A and 10B show the cross-sectional images of chitosan-ST-60 (1:2000) and chitosan-ST-325 (1:2000 wt. ratio) TE composite films at a 1 µm resolution. SEM images confirmed that ST-60 TE composite films: a combination of fine and coarse particles which, when subjected to mechanical pressure will result in a textured structure. Indeed, pressure-induced densification merges (i.e., plastically deforms) fine and coarse particles in ST-60 to form conducting path for holes transport through the P-type composite. When grains (that were initially separated by insulating binder, pores, and voids) are merged and come in electrical contact on the application of pressure, grain-boundary interfaces increase. On the one hand, the contacted grains increased mean free paths for charge carriers and facilitated hole transport. On the other hand, increased interfaces help scatter phonons and reduce thermal conductivity. This SEM image also confirms that P-type active particles (fine and coarse) are not only very well connected with each other, but also densely packed together. This enhancement in packing density would also result in better electrical connections between active particles, thus, providing a continuous path for charge carriers to flow, thereby improving the electrical conductivity of ST-60 TE composite films.

The cross-sectional SEM images of ST-325 films pressed at 200 MPa was shown in FIG. 10B, which shows fine-grain coalescence behavior to some extent. However, in comparison with ST-60 films the ST-325 films have a substantially higher number of grain boundaries due to the presence of mostly fine grains. These grain boundaries then result in an increase in grain boundary scattering by the fine grains (particles). The active charge carriers struggle to find a continuous path to flow because of the presence of pores, voids, and grain boundary interfaces which results in very high grain boundary scattering, thus, reducing the electrical conductivity of the TE composite films. Moreover, as shown in FIG. 10B, ST-325 TE composite films have many pores and voids, as depicted by the yellow arrows. The presence of pores and voids in ST-325 films may be explained on the basis that fine particles did not pack very well even under the application of pressure, unlike the ST-60 particles.

Density measurements were performed on chitosan-ST-60 (1:2000) and chitosan-ST-325 (1:2000 wt ratio) composite films (two samples each) to confirm the packing density theory. The ST-60 films have an average density of 6.17 g/cm$^3$, which is 95.8% of the bulk density (6.44 g/cm$^3$) (www.matweb.com). These measurements also confirm that the combination of fine and coarse particles in ST-60 mesh particles are packed very well and have a density closer to the bulk ST values. The high packing density of ST-60 composite films resulted in a textured structure with large mean free path and less grain boundary scattering centers which contributed to improvement in electrical conductivity. In contrast, the average density for the ST-325 composite films was 4.50 g/cm$^3$, which is only 70% of the bulk packing density. The lower density of ST-325 composite films indicates a presence of pores and voids, and more scattering centers, thus resulting in a lower electrical conductivity.

TABLE 3

Density comparison of chitosan-TE composite films (1:2000) and bulk

| TE-chitosan composite films | Sample density (g/cm$^3$) | | Bulk density (g/cm$^3$) |
|---|---|---|---|
| | 60/100 mesh | 325 mesh | |
| $Sb_2Te_3$ | 6.17 | 4.50 | 6.44 |
| $B_{0.5}Sb_{1.5}Te_3$ | 6.00 | 4.65 | 6.8 |

Figure 9B:
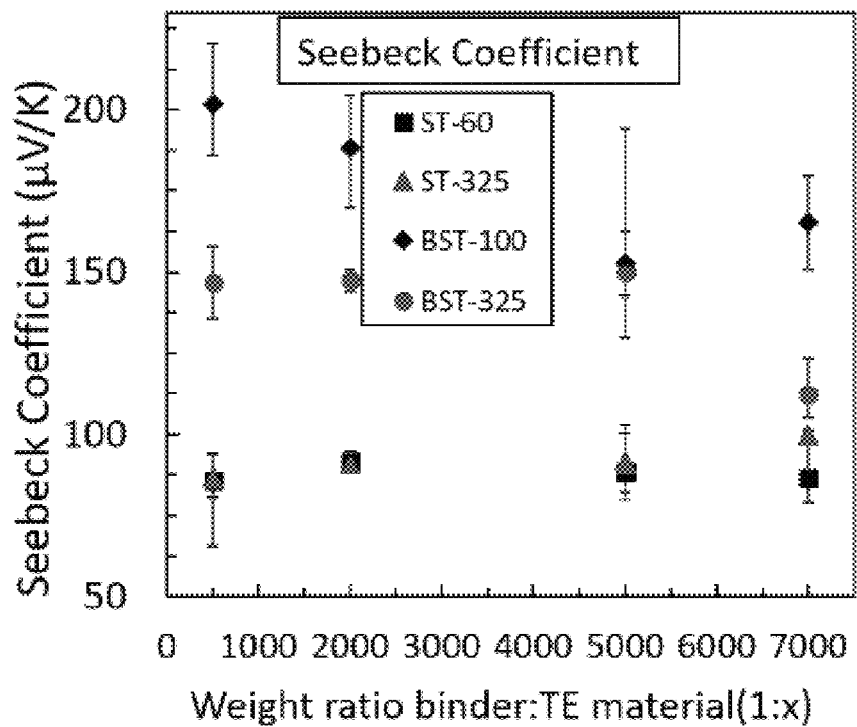
FIG. 9B shows the Seebeck coefficient of composite chitosan TE P-type films based on different material (ST and BST), ST particle mesh size (60 mesh and 325 mesh), BST (100 mesh and 325 mesh) and the weight ratio of chitosan binder to TE material (1:500, 1:2000, 1:5000, 1:7000).

For the P-type chitosan-BST-100 TE composite films (1:2000), the best average electrical conductivity was 600 S/cm as shown in FIG. 9A. This value of electrical conductivity value is one order lower as compared to bulk BST (1000-1100 S/cm) (Poudel (2008)). The corresponding average Seebeck coefficient value for these BST-100 composites films was 192 µV/K which resulted in an average power factor of 2224 µW/mK$^2$ as shown in FIGS. 9B and 9E respectively. Moreover, the carrier concentration was observed to be $5.9 \times 10^{19}/cm^3$, which is the same as bulk carrier concentration. The average electrical conductivity for BTS-325 films (1:2000) was 170 S/cm, the average Seebeck coefficient was 197 µV/K, and the power factor obtained was 665 µW/mK$^2$, as shown in FIGS. 9A, 9B, 9C, and 9E, respectively. The corresponding carrier concentration was observed to be $4.6 \times 10^{19}/cm^3$. From the above results, it can be inferred that the chitosan-BST-100 composite films have better thermoelectric properties relative to the chitosan-BST-325 composite films.

The best average electrical conductivity value (600 S/cm) was observed for the chitosan-BST-100 films with a weight-ratio of 1:2000 which is likely due to a combination of a wide particle size distribution and an applied mechanical pressure, as explained above for ST-60 vs ST-325 films. FIGS. 10C and 10D show the SEM images for the pressed BST-100 and BST-325 composite films, which depict the same behavior as ST lower and higher mesh films, respectively. In BST-100 films, mixed grains (that were initially separated by insulating binder, pores, and voids) were merged (i.e., plastically deformed) and came in electrical contact on the application of pressure. The contacted grains increased the mean free path for charge carriers and facilitated hole transport. In contrast, for BST-325 composite films as shown in FIG. 10D, more grains, grain boundaries, pores and voids were present. All these factors contribute to more grain boundary scattering and lower electrical conductivity in BST-325 composite films. The density measurements were performed on BST-100 and BST-325 composite films. The average density for the BST-100 composite films was 6 g/cm$^3$, which is 88% of the bulk BST density (Li (2016)). These measurements confirm that the combination of fine and coarse particles in BST-100 particles packed very well and resulted in a packing density closer to the density of BST bulk samples, thus improving the electrical conductivity, whereas the average density for BST-325 composite films was 4.65 g/cm$^3$; about 68% of bulk BST samples.

The best average electrical conductivity of chitosan-ST-60 composite films was 1353±138 S/cm and that of BST-100 composite was 600±111 S/cm. This shows that the electrical conductivity of ST composite films was high and about 77% of bulk ST electrical conductivity. The electrical conductivity of BST-100 composite films is almost half of bulk BST values. It is believed that since the particle size distribution of ST-60 is wider than that of BST-100, for the same weight ratio of chitosan to particles (1:2000), the ST-60 composite films will have less grain boundaries and thus less charge carrier scattering and, therefore, a higher electrical conductivity. Moreover, the ST composite film has a higher relative density compared to that of the BST composite film. A higher density means the particles are packed very well, resulting in a higher electrical conductivity.

FIG. 9B shows the Seebeck coefficient results of chitosan-ST (60 and 325) and chitosan BST (100 and 325) TE composite films with respect to various weight ratio of binder to TE particles. Overall, the Seebeck coefficient values of the BST composite films (186-202 µV/K) were high compared to the ST composites (91-100 µV/K) TE films. The positive values of the Seebeck coefficient confirm that the ST and BST composite films are P-type TE films. The Seebeck coefficient values of ST and BST TE composite films did not show much variation when the binder-to-particle weight ratio or the particle size was changed. The average Seebeck coefficient value of ST TE composite films (95 µV/K) is comparable to bulk ST materials (110 µV/K) (Cao (2016)). Similarly, the average Seebeck coefficient value of chitosan-BST TE composite films (190 µV/K) is comparable to bulk BST materials (200-210 µV/K) (Poudel (2008), Chen (2009)). In chitosan-ST and chitosan-BST TE composite films, the amount of insulating binder is very small (10') compared to the active TE particles. Therefore, the Seebeck coefficient value of TE composite films was not substantially affected by the chitosan binder. The determining factor affecting the values of the Seebeck coefficient was the TE material (Madan (2015)).

Figure 9C:
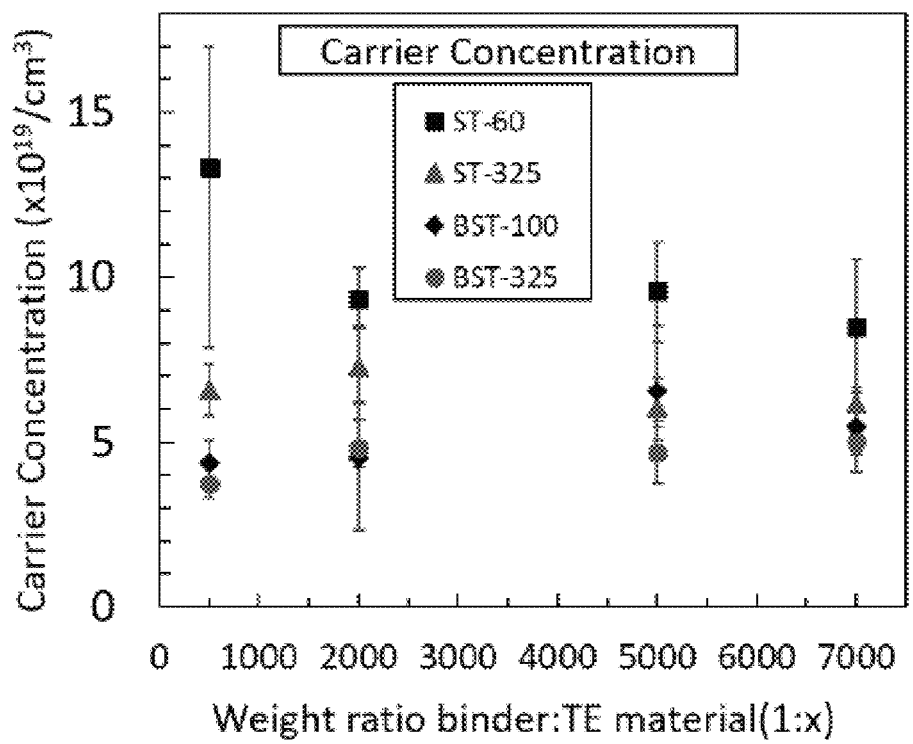
FIG. 9C shows the charge carrier concentration of composite chitosan TE P-type films based on different material (ST and BST), ST particle mesh size (60 mesh and 325 mesh), BST (100 mesh and 325 mesh) and the weight ratio of chitosan binder to TE material (1:500, 1:2000, 1:5000, 1:7000).

FIG. 9C shows the carrier concentration of chitosan-ST (60 and 325) and chitosan-BST (100 and 325) TE composite films with respect to various weight ratios of binder to TE particles. No change was observed in carrier concentration of the chitosan-ST TE composite films when changing the particle size or the binder-to-particle weight ratio. Similar behavior was also observed for chitosan-BST TE composite films. The carrier concentration of chitosan-ST composite films was higher than chitosan-BST composite films as can be seen in FIG. 9C.

Figure 9D:
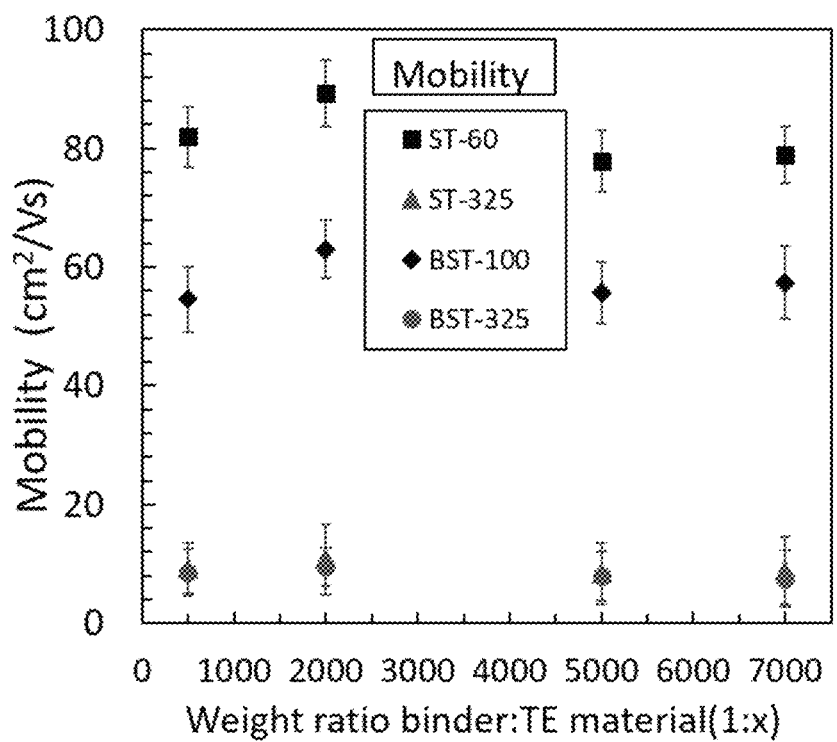
FIG. 9D shows the charge mobility of composite chitosan TE P-type films based on different material (ST and BST), ST particle mesh size (60 mesh and 325 mesh), BST (100 mesh and 325 mesh) and the weight ratio of chitosan binder to TE material (1:500, 1:2000, 1:5000, 1:7000).
Figure 9E:
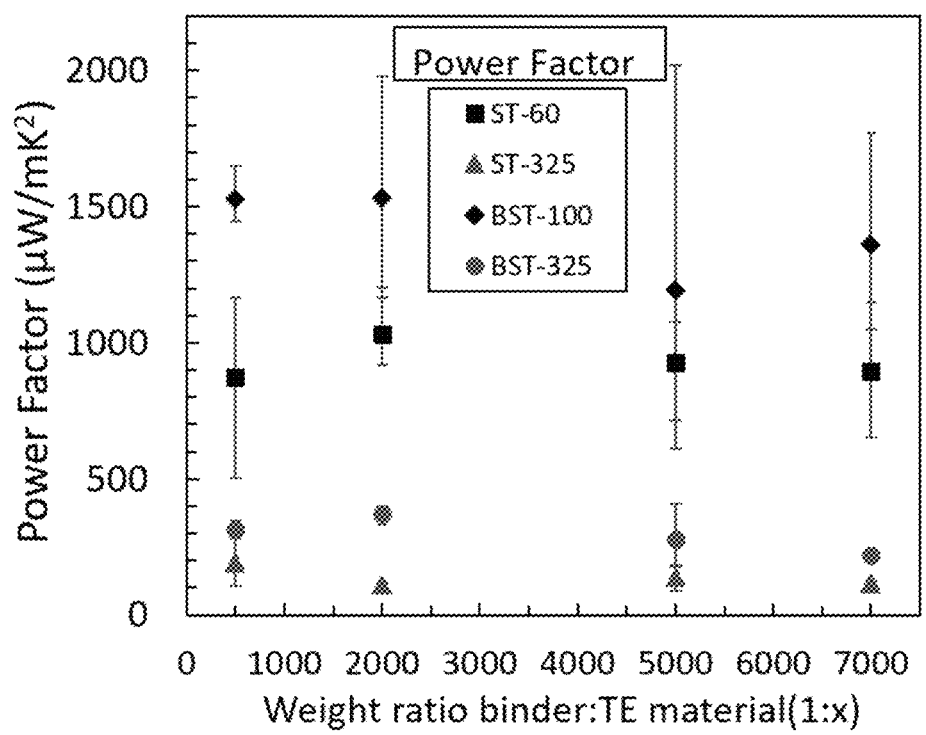
FIG. 9E shows the Power Factor of composite chitosan TE P-type films based on different material (ST and BST), ST particle mesh size (60 mesh and 325 mesh), BST (100 mesh and 325 mesh) and the weight ratio of chitosan binder to TE material (1:500, 1:2000, 1:5000, 1:7000).

FIG. 9D shows mobility measurements for ST/BST higher- and lower-mesh composites. The higher mobility of lower-mesh composites is likely due to the presence of the textured structure that resulted in a larger mean-free path. Carrier mobility is the likely factor behind higher electrical conductivity for lower-mesh (ST-60 and BST-100) composites.

FIG. 9E shows the power factor of chitosan-ST (60 and 325) and chitosan BST (100 and 325) TE composite films with respect to various weight ratios of binder to TE particles. ST-60 TE composite films have a higher electrical conductivity (1350 S/cm) than the BST-100 composite films (600 S/cm). However, the Seebeck coefficient of BST-100 composite films (192 µV/K) is much higher when compared to the Seebeck coefficient of ST-60 composite films (95 µV/K). Therefore, the power factor of BST-100 composite films was higher than the power factor of ST-60 composite films. Films of the prior art using alternative binders (e.g., epoxy, polystyrene, and Epichlorohydrin polyglycol-based epoxy) used a much larger weight % of the binder (approximately 5-25 wt %) than used in the current chitosan-ST/BST composite films and the power factor and ZT are much lower.

Thermoelectric properties of the chitosan-BST-100 (1:2000 wt ratio) at 200 MPa composite films at four different temperatures 25° C., 50° C., 75° C., and 100° C. were determined. As shown in FIG. 11, the thermoelectric properties are stable and comparable in the range of 25-100° C. Specifically, the electrical conductivity is in the 500-530 S/cm range, the Seebeck coefficient is in the 181-190 µV/K range, and the power factor is in the 1730-1780 µW/mK$^2$ range. These results are similar to those reported in the literature on printable TE composite films.

Figure 19C:
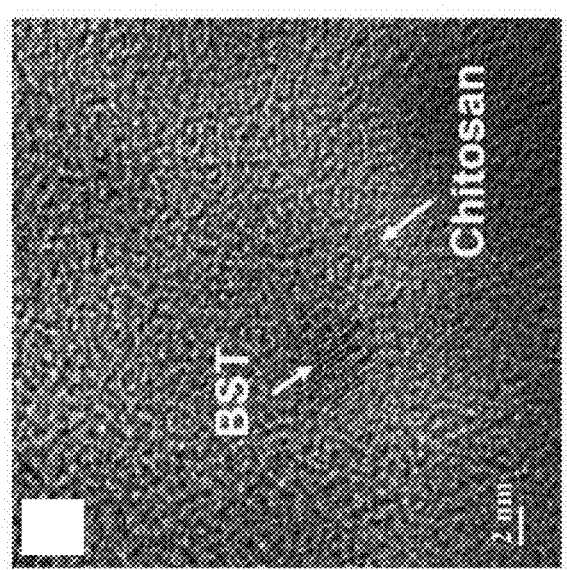
FIG. 19C is another HRTEM image of chitosan BST-100 mesh composite films showing the presence of chitosan binder interfaces.
Figure 19B:
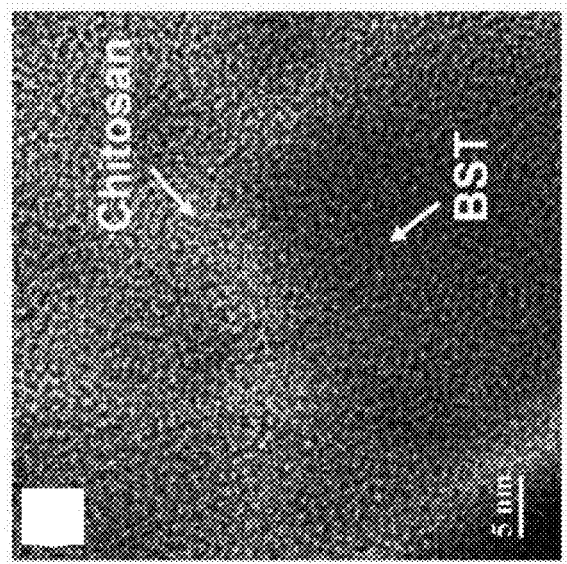
FIG. 19B is another HRTEM image of chitosan BST-100 mesh composite films showing the presence of chitosan binder interfaces.
Figure 19A:
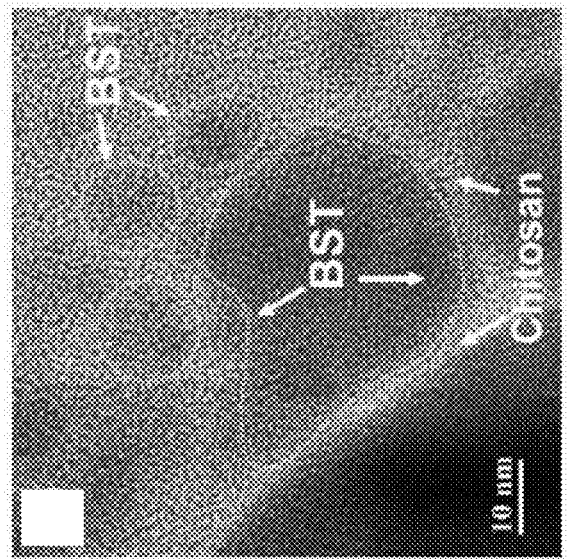
FIG. 19A is an HRTEM image of chitosan BST-100 mesh composite films showing the presence of chitosan binder interfaces.

Thermal conductivity of the best performing chitosan-ST-60 (1:2000 binder-to-particle weight ratio) and chitosan-BST-100 (1:2000 binder-to-particle weight ratio) TE composite films was measured using a modified transient plane source technique. The measured thermal conductivity of ST-60 was 0.65 W/mK, and that of BST-100 was 0.61 W/mK. The thermal conductivity values of bulk ST are 1.6 W/mK and that of bulk BST is 0.9-1.4 W/mK (Poudel (2008), Li (2013), Rowe (2006)). This reduction in lattice thermal conductivity can be attributed to the presence of nanostructures in the film including TE particles and pores. These nano-structures scatter phonons and help lower the overall thermal conductivity, as explained in Example 1. In addition, particle-particle and particle-polymer interfaces increase the interfacial thermal resistance and help lower the thermal conductivity of the composite film. In addition, weak bonds formed at particle-particle interfaces (due to uniaxial applied pressure and plastic deformation of particles) will scatter phonons but not electrons, reducing lattice thermal conductivity (Yu (2008)). Although not shown, Raman spectra confirmed the presence of chitosan in the BST-100 composite films. A small amount of chitosan binder spread around the TE particles, as confirmed by HRTEM (see, FIGS. 19A-19C), creating particle-polymer interfaces which also help lower the thermal conductivity of the composite films.

Therefore, the film synthesis approach described herein helps enhance electrical conductivity without significantly affecting thermal conductivity and hence results in the reported ZT of 1 for BST-100 composite film (see, Table 4).

TABLE 4

The best average value of Electrical conductivity, Seebeck coefficient, power factor, thermal conductivity, and ZT for chitosan TE composite films

| TE powder | Wt. ratio (chitosan:TE) | Particle mesh size | Electrical conductivity (S/cm) | Seebeck coefficient (µV/K) | Power factor (µW/mK$^2$) | Thermal conductivity (W/mK) | Figure of merit |
|---|---|---|---|---|---|---|---|
| Sb$_2$Te$_3$ | 1:2,000 | 60 mesh | 1353 ± 138 | 96 ± 4.6 | 1249 ± 175 | 0.652 | 0.5 ± 0.1 |
| Bi$_{0.5}$Sb$_{1.5}$Te$_3$ | 1:2,000 | 100 mesh | 600 ± 111 | 192.2 ± 7.7 | 2224 ± 308 | 0.61 | 1.0 ± 0.2 |

Accordingly, there is an advantage associated with engineering nano defects and interfaces among large grains of active thermoelectric particles. First, the thermoelectric particles comprising some large but also heterogeneous sizes facilitate electron transport. The heterogeneous size of particles helps achieve a compact packing of active particles. The compact packing of particles, helps reduce the amount of polymer binder in the composite. Second, a small amount (<1 wt. %) of a highly adhesive binder (chitosan) can be used, which allows for the reduction of the inter-grain binder to nanometer range. Third, external pressure can be applied which reduces the size of defects and increases the size of grains in the composite. The resulting textured structure, in which grains are connected by weak van der Waals forces, plays a role in facilitating phonon scattering and reducing lattice thermal conductivity.

Example 4

A 2-leg P-type BST thermoelectric generator (TEG) device was fabricated. The BST device was printed on a gold coated electrode on a Kevlar substrate. A stencil printing method was used to print the BST-100 composite inks as P-type and Ag ink as other leg. The BST-100 TEG device resistance was 2 ohms. The open circuit voltage of this prototype was 4.2 mV at ΔT of 11.9 K. Using the open circuit voltage equation, the Seebeck coefficient of the BST-100 single leg was calculated to be 186 µV/K, which is similar to the average Seebeck coefficient of P-type BST composite films (190 µV/K).

Figure 12A:
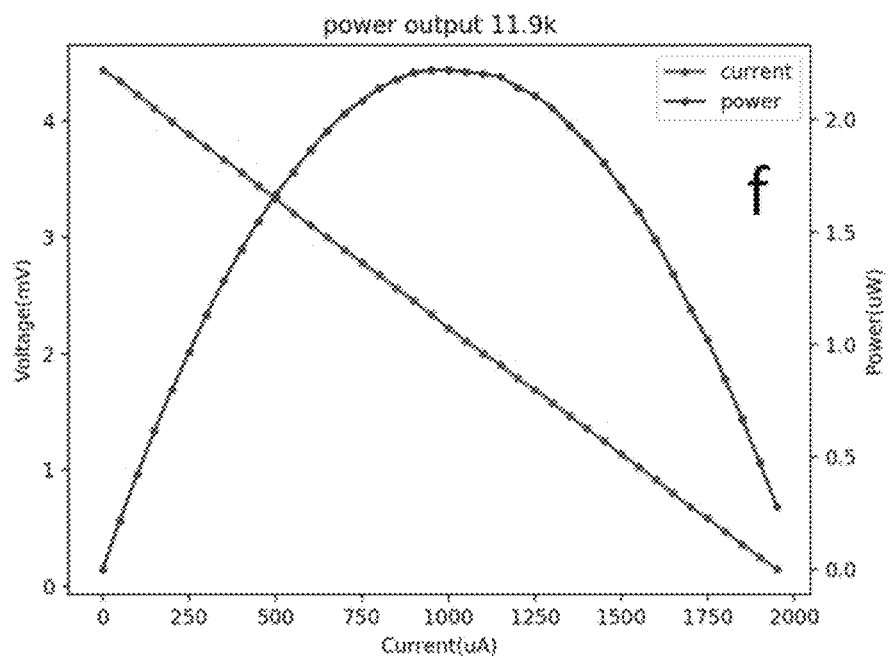
FIG. 12A shows the power output characterization of the 2-kg BST-100 TEG prototype at $\Delta T$ of 11.9 K.
Figures 12B, 12C, 12D:
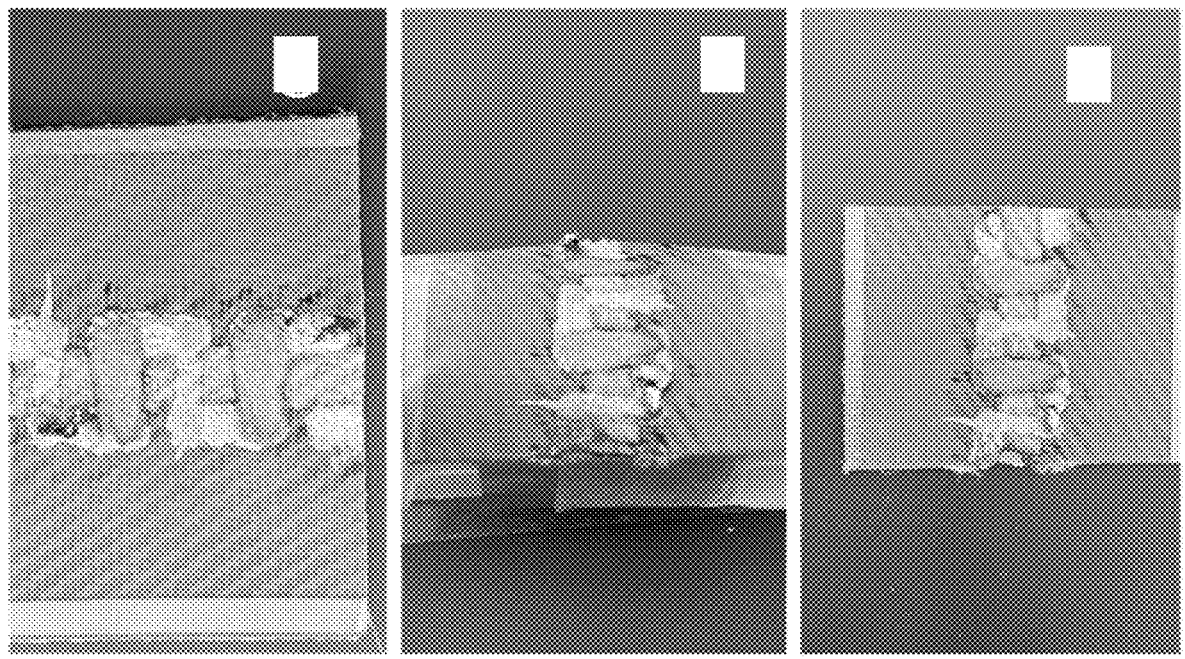
FIG. 12B shows the BST-100 TEG device before bending.
FIG. 12C shows the BST-100 TEG device during bending.
FIG. 12D shows the BST-100 TEG device after bending.

Figure as A shows the power output characteristics of the BST prototype at ΔT of 11.9 K. The maximum power was obtained when the device resistance matched the load resistance, which was computed to be 2.2 µW at a closed circuit voltage of 2.1 my and ΔT of 11.9 K. In addition, a manual 200 cycles of bending test was performed on the BST device, as shown in FIGS. 12B-12D. After 200 bending cycles, the device did not show any visual cracks or flaws. The device resistance changes from 2 ohms to 4 ohms after bending experiments. However, the voltage output of the BST device was the same and resulted in power output of 0.67 µW at a closed circuit voltage of 2 mV.

Example 5

A 3-leg BST TEG device was stencil-printed using BST-100 (1:2000 wt ratio) with thermoelement dimensions of 5 mm×7 mm×70 µm (length×width×thickness) (Madan (2015), Chen (2011), Kim (2015)). The voltage and power output characterizations were performed at room temperature. The measured TEG open-circuit voltage increased linearly with ΔT and is comparable to the ideal open-circuit voltage calculated using a Seebeck coefficient of BST-100 films (FIG. 13A). The maximum power output of 58 µW was achieved at ΔT of 38 K with a closed-circuit voltage of 10 mV and a current of 6 mA (FIG. 13B). The maximum device power density of 3.5 mW/cm2 was obtained at ΔT of 38 K (FIG. 13C). The corresponding power density was 5.72 mW/cm2 when the area between thermoelements was not included (Varghese (2019)). The increase in the gap between the ideal and measured power density curves with ΔT can be attributed to increased device electrical resistance with temperature. The TEG device fabricated using an energy-efficient method achieved an ultra-high-power density which is among the best reported for single-leg TEG devices. The flexibility of this device was also performed (FIG. 13D). These devices can potentially be used as self-sufficient and long-lasting power supplies for powering sensors and charging batteries in individual and miniature next-generation wearable device applications.

Example 6 p-type chitosan-100 mesh BST (1:2000 wt ratio) and N-type chitosan-100 mesh Bi (1:2000 wt ratio) inks were used. Using these P- and N-type inks, P- and N-type films (thickness 150 µm, area 7 mm×7 mm) were stencil printed and hot pressed them at a temperature of 120° C. for 30 min at 200 MPa applied pressure. Since the TEG device is intended for low waste heat applications (up to 100° C.), high-temperature (25° C., 50° C., 75° C., and 100° C.) electrical conductivity and Seebeck coefficient measurements for N- and P-type composite films was carried out. The in-plane room-temperature and high-temperature electrical conductivity was measured using a Hall effect measurement system (Ecopia HMS-3000) together with a heating controller (HMS-3300) to increase the temperature up to 100° C. For the Seebeck coefficient measurement, the custom setup described herein was used to measure the Seebeck coefficient at room temperature and high temperature (50° C., 75° C., and 100° C.). The Thermal conductivity of the P-type chitosan-BST composite film was measured using TCi thermal conductivity, as described herein. The thermal conductivity of chitosan-Bi composite film was measured using the optical pump-probe technique steady-state thermoreflectance as described in our previous publication (Jang (2020)).

Figure 15:
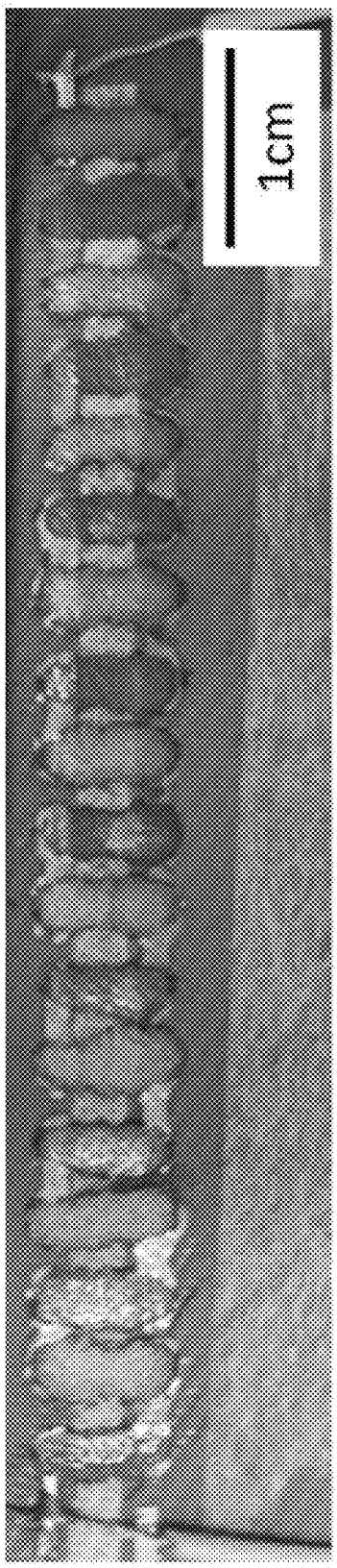
FIG. 15 is a photograph of the TEG prototype with scale.

For TEG device fabrication, gold-coated Cu electrode was first deposited on a Kevlar substrate to avoid the high contact resistance between Kevlar substrates. This was followed by stencil printing of N- and P-type thermoelements on the Kevlar substrate. The gold-coated Cu electrodes (70

μm Cu, 5 μm Ni, 0.03 μm Au) were fabricated in South Korea (PASF250, Sueco Advanced Material Co., Ltd.) on Kevlar substrates using a customized device pattern. On top of the gold electrodes, solder paste (130 μm thick) was stencil printed. The application of soldering paste provided better adhesion between gold electrodes and thermoelements as well as avoided delamination of thermoelements after hot pressing. Commercially available solder paste (DS-0201LF58) was purchased from a Korean company (Danyang SOLTEC.) and stencil printed on the gold electrodes using stencil mask. The resistivity of the solder paste was $2.4 \times 10-8 \Omega$-m. Next, P-type chitosan-100 mesh BST (1:2000 wt ratio) and N-type chitosan-100 mesh Bi (1:2000 wt ratio) TE inks were stencil printed on the substrate to form P- and N-type thermoelements, respectively. The dimensions of each thermoelement was 6.5 mm (L)×2.3 mm (W)×160 μm (T) while the spacing between two thermoelements was 2.5 mm. The deposited thermoelements were cured at 120° C. in a vacuum oven to evaporate the solvent for 10 min followed by hot-pressing at 200 MPa at a temperature of 120° C. under nitrogen inert atmosphere for 30 min. The hot pressing provided the compact and dense film morphology to enhance the TE films' electrical conductivity. Hot pressing also facilitated a good adhesion reducing the overall contact resistance of the TEG device. Two Kapton films were placed on the top and bottom of the TEG device before hot-pressing to avoid any possible contamination on the surface of the thermoelements. Electrical connections were made using soldering paste and Cu electrical wires. The schematic for ink synthesis and fabrication of the TEG prototype is shown in FIGS. 14A and 14C, respectively. The actual image of TEG device is shown in FIG. 15.

Figure 16C:
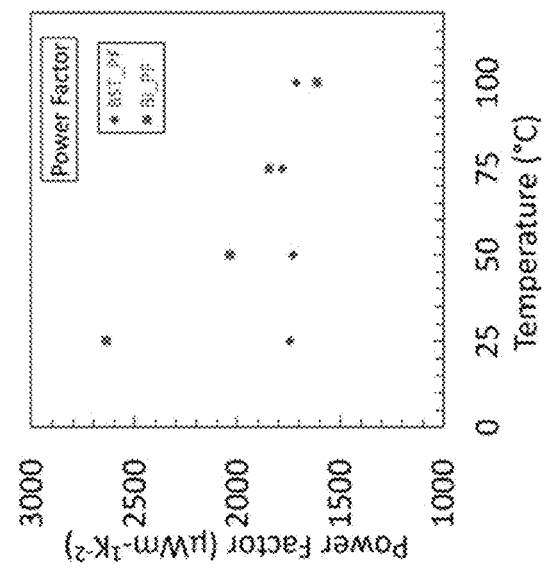
FIG. 16C shows the Power Factor of P-type chitosan 100-mesh BST films and N-type chitosan-100 mesh Bi films (1:2000 wt ratio, hot pressed at 200 MPa at 120° C. for 30 min) at 25° C., 50° C., 75° C., and 100° C.
Figure 16B:
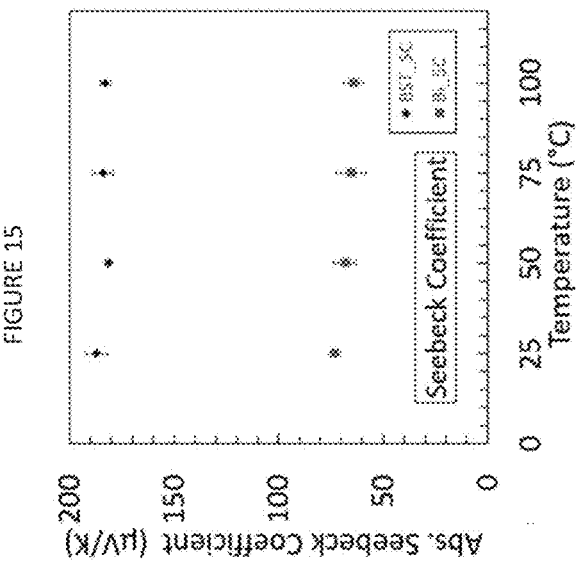
FIG. 16B shows the Seebeck coefficient of P-type chitosan 100-mesh BST films and N-type chitosan-100 mesh Bi films (1:2000 wt ratio, hot pressed at 200 MPa at 120° C. for 30 min) at 25° C., 50° C., 75° C., and 100° C.
Figure 16A:
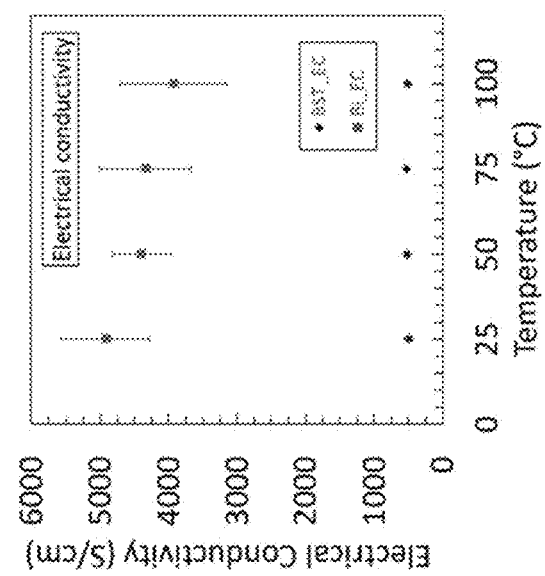
FIG. 16A shows the electrical conductivity of P-type chitosan 100-mesh BST films and N-type chitosan-100 mesh Bi films (1:2000 wt ratio, hot pressed at 200 MPa at 120° C. for 30 min) at 25° C., 50° C., 75° C., and 100° C.

The electrical conductivity and Seebeck coefficient of P-type chitosan 100 mesh BST and N-type chitosan Bi composite films (1:2000 wt ratio, hot pressed at 200 MPa) were measured at four different temperatures:25° C. 50° C., 75° C., and 100° C. This was primarily done to observe how temperature and Seebeck coefficient affect the electrical conductivity of N- and P-type composite films prepared using hot pressing at 120° C. for 30 min. These properties were measured up to 100° C. to predict the stability and behavior of TEG devices fabricated using N- and P-type composite inks when the surrounding temperature is higher than room temperature. FIGS. 16A and 16B show the in-plane measurements of electrical conductivity and Seebeck coefficient for P-type chitosan-100 mesh BST and N-type chitosan-100 mesh Bi composite films, respectively.

From FIGS. 16A and 16B, we can see that the electrical conductivity (EC) and the Seebeck coefficient (SC) for the chitosan-BST composite films do not change significantly with increasing temperature. The electrical conductivity for the chitosan-BST composite films was in the range of 500-530 S/cm, which is lower than bulk BST electrical conductivity of 1200 S/cm, likely due to the presence of insulating binder and the grain boundaries of thermoelectric particles. The Seebeck coefficient of P-type composite films was in the range of 175-185 μV/K, similar to the Seebeck coefficient of bulk BST and printed BST composite films. The similarity in the results of EC and SC yielded a power Factor (PF) ranged from 1730 to 1780 μW/mK2 and did not vary much with varying temperature, as seen in FIG. 16C. The thermal conductivity of the chitosan-100 mesh BST composite film was 0.62 W/m-K at room temperature and therefore ZT was 0.85.

Figure 17:
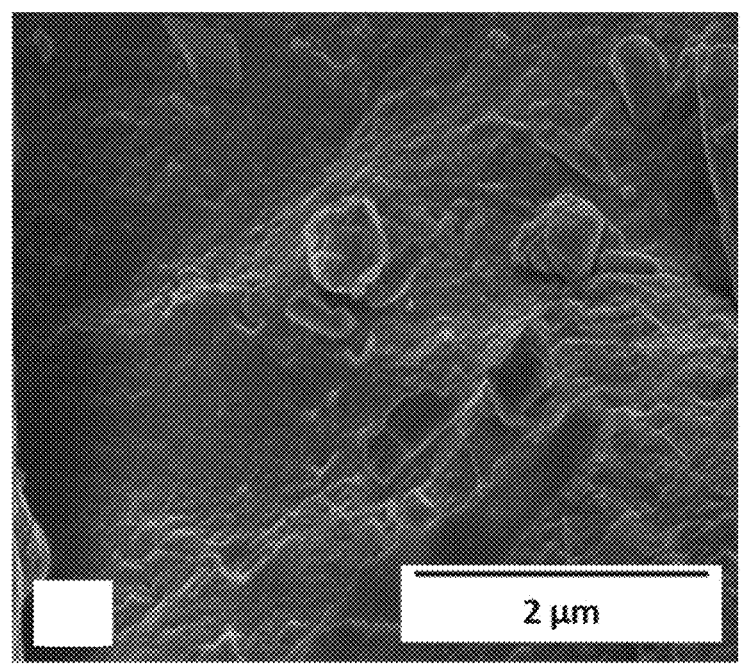
FIG. 17 shows a cross-sectional SEM image for chitosan-100 mesh Bi composite films (1:2000 wt ratio), hot pressing at 120° C. for 30 min.

As seen in FIG. 16A, the electrical conductivity of Bi chitosan composite film gradually decreased with increasing temperature. The electrical conductivity of Bi chitosan composite films at room temperature was about 5000 S/cm, which is two-thirds of the electrical conductivity value of bulk Bi (8333 S/cm) (Hostler (2008)). The presence of an insulating chitosan binder in Bi composite films likely explains the lower electrical conductivity of the Bi-chitosan composite film as compared to bulk Bi. Advantageously, the electrical conductivity of chitosan-100 mesh Bi composite films (1:2000 wt ratio) is one order of magnitude greater than the previously reported Bi epoxy composite films (Madan (2014)). To understand the improvement in chitosan Bi composite films, SEM analysis was performed. The corresponding SEM image is shown in FIG. 17. The image of Bi chitosan composite film shows a heterogenous particle size distribution of Bi (100 mesh), small amount of binder (0.05 wt %) and hot pressing at 120° C. All of these factors combined to achieve a bulk-like, compact, and dense structure for the Bi-chitosan composite film. This bulk-like structure was beneficial in achieving electrical conductivity of Bi composite film similar to bulk Bi (semi metals). These Bi films, therefore, behave like semi-metals at high temperature. For example, the electrical conductivity of Bi chitosan composite films decreased to 4000 S/cm when the temperature was increased to 100° C. For semimetals at elevated temperatures, thermal vibrations in the atoms intensify, leading to an increase in the scattering of charge carriers. This scattering of charge carriers causes the mean free path of the electrons to decrease, thereby reducing the mobility of electrons. This leads to a decrease in the overall electrical conductivity of the metals/semimetals at high temperature. The Seebeck coefficient of Bi chitosan composite films did not change much with increasing temperature and was in the range of −65 to −72 μV/K. The decrease in electrical conductivity with increasing temperature affects the power factor of the N-type composite films in a similar manner. Therefore, from FIG. 16C it is evident that the power factor also decreases as the temperature increases for N-type Bi-chitosan composite films. The measured thermal conductivity of Bi-chitosan composite films was 4.4 W/m-K at room temperature and therefore ZT was 0.18.

The TEG prototype generated a maximum power output of 73 μW at 2.9 mA current and a closed-circuit voltage of 25 mV at ΔT of 40 K. Also, a maximum areal power density of 566 μW/cm2 was obtained at ΔT of 40 K.

The power and power density generated from these cost-effective, energy efficient and scalable TEGs are suitable for various low-grade waste heat recovery applications. Advantageously, the utilization of earth abundant materials like chitosan and bismuth contributed to the reduction of the cost per unit area of the fabricated TEGs. The power and power density values obtained by the TEG prototype presented in this example will be sufficient to supply power to wireless sensors (10 μW~1.8 mW) and wearable sensors (<70 μW). Since these TEG have been fabricated on Kevlar substrate, they can also be easily used for waste heat recovery applications on non-planar surfaces. Moreover, these TEGs can be integrated with rechargeable batteries to supply enough power to charge these batteries.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

L. Abadlia, F. Gasser, K. Khalouk, M. Mayoufi, and J. G. Gasser, New Experimental Methodology, Setup and LabView Program for Accurate Absolute Thermoelectric Power and Electrical Resistivity Measurements Between 25 and 1600 K: Application to Pure Copper, Platinum, Tungsten, and Nickel at Very High Temperatures. *Rev. Sci. Instrum.* 85, 095121 (2014).

Antimony Telluride, Sb2Te3 MatWeb, Your Source for Materials Information—www.matweb.com A. T. Burkov, A. Heinrich, P. P. Konstantinov, T. Nakama, and K. Yagasaki, Experimental Set-Up for Thermopower and Resistivity Measurements at 100-1300 K. *Meas. Sci. Technol.* 12, 264 (2001).

Byun S H, Kim C S, Agno K C, Lee S, Li Z, Cho B J, et al. Design strategy for transformative electronic system toward rapid, bidirectional stiffness tuning using graphene and flexible thermoelectric device interfaces. Adv Mater 2021; 33(10): 2170076.

Cao, Z.; Tudor, M. J.; Torah, R. N.; Beeby, S. P. Screen Printable Flexible BiTe— SbTe-Based Composite Thermoelectric Materials on Textiles for Wearable Applications. *IEEE Transactions on Electron Devices*. 2016, 63, 10, 4024-4030.

A. Celzard, J. F. Mareche, F. Payot, and G. Furdin, Electrical conductivity of carbonaceous powders. *Carbon* 40, 2801 (2002).

D. Champier, Thermoelectric generators: A review of applications. *Energy Conyers. Manag.* 140, 167 (2017).

A. Chen, D. Madan, M. Koplow, P. K. Wright, J. W. Evans, Dispenser printed thermoelectric energy generators, *Proc. Power MEMS* 2009 (2009) 277-280.

A. Chen, D. Madan, P. K. Wright, and J. W. Evans, Dispenser-Printed Planar Thick-Film Thermoelectric Energy Generators. *J. Micromechanics Microengineering* 21, 104006 (2011).

H. Choi, S. J. Kim, Y. Kim, J. H. We, M.-W. Oh, and B. J. Cho, Enhanced Thermoelectric Properties of Screen-Printed Bi0.5Sb1.5Te3 and Bi2Te2.7Se0.3 Thick Films Using a Post Annealing Process with Mechanical Pressure. *J. Mater. Chem. C* 5, 8559 (2017).

H. Choi, Y. J. Kim, C. S. Kim, H. M. Yang, M. W. Oh, and B. J. Cho, Enhancement of Reproducibility and Reliability in a High-Performance Flexible Thermoelectric Generator Using Screen-Printed Materials. *Nano Energy* 46, 39 (2018).

Y. Dong, Y. Ruan, H. Wang, Y. Zhao, and D. Bi, Studies on glass transition temperature of chitosan with four techniques. *J. Appl. Polym. Sci.* 93, 1553 (2004).

Du, B.; Hu, S.; Singh, R.; Tsai, T.; Lin, C.; Ko, F. Eco-Friendly and Biodegradable Biopolymer Chitosan/Y2O3 Composite Materials in Flexible Organic Thin-Film Transistors. *Materials* 2017, 10, 1026.

S. Fan, J. Zhao, J. Guo, Q. Yan, J. Ma, and H. H. Hng, P-type Bi0.4Sb1.6Te3 Nanocomposites with Enhanced Figure of Merit. *Appl. Phys. Lett.* 96, 182104 (2010).

A. Gharleghi, Y. Liu, M. Zhou, J. He, T. M. Tritt, and C. J. Liu, Enhancing the Thermoelectric Performance of Nano-sized CoSb3:Via Short-Range Percolation of Electrically Conductive WTe2 Inclusions. *J. Mater. Chem. A* 4, 13874 (2016).

Glatz W, Muntwyler S, Hierold C. Optimization and fabrication of thick flexible polymer based micro thermoelectric generator. Sensors Actuators A Phys 2006; 132:337-45.

L. D. Hicks and M. S. Dresselhaus, Thermoelectric Figure of Merit of A One-Dimensional Conductor. *Phys. Rev. B* 47, 16631-16634 (1993).

A. I. Hochbaum, R. Chen, R. D. Delgado, W. Liang, E. C. Garnett, M. Najarian, A. Majumdar, P. and Yang, Enhanced thermoelectric performance of rough silicon nanowires. *Nature* 451, 163 (2008).

S. R. Hostler, Y. Q. Qu, M. T. Demko, A. R. Abramson, X. Qiu, and C. Burda, Thermoelectric properties of pressed bismuth nanoparticles. *Superlattices Microstruct.* 43, 195, (2008).

A. F. Ioffe, *Semiconductor Thermoelements and Thermoelectric Cooling* (Infosearch Ltd., London, 1957a), pp. 86-87

A. F. Ioffe, *Semiconductor Thermoelements and Thermoelectric Cooling* (Infosearch Ltd., London, 1957b), pp. 100-101.

Jang, E.; Poosapati, A.; Jang, N.; Hu, L.; Duffy, M.; Zupan, M.; Madan, D. Thermoelectric Properties Enhancement of P-Type Composite Films Using Wood-Based Binder and Mechanical Pressing. *Sci. Rep.* 2019, 9, 1, No. 7869.

E. Jang, P. Banerjee, J. Huang, R. Holley, J. T. Gaskins, M. S. Bin Hogue, P. E. Hopkins, D. Madan, Thermoelectric performance enhancement of naturally occurring bi and chitosan composite films using energy efficient method, Electron 9 (2020) 1-12.

J. Jiang, L. Chen, S. Bai, Q. Yao, and Q. Wang, Fabrication and thermoelectric performance of textured n-type $Bi_2(Te,Se)_3$ by spark plasma sintering. *Mater. Sci. Eng. B* 117, 334 (2005).

H. S. Kim, Z. M. Gibbs, Y. Tang, H. Wang, and G. J. Snyder, Characterization of Lorenz number with Seebeck coefficient measurement. *APL Mater.* 3, 041506 (2015).

K. Kishimoto and T. Koyanagi, Preparation of Sintered Degenerate N-Type PbTe with a Small Grain Size and its Thermoelectric Properties. *J. Appl. Phys.* 92, 2544 (2002).

J. K. Lee, J. H. Son, S. D. Park, S. Park, and M. W. Oh, Control of oxygen content of n-type $Bi_2Te_3$ based compounds by sintering process and their thermoelectric properties. *Mater. Lett.* 230, 211 (2018).

F. Li, X. Huang, Z. Sun, J. Ding, J. Jiang, W. Jiang, and L. Chen L, Enhanced thermoelectric properties of η-type $Bi_2Te_3$-based nanocomposite fabricated by spark plasma sintering. *J. Alloys Compd.* 509, 4769 (2011)

H. Li, H. Jing, Y. Han, G. Q. Lu, and L. Xu, Effects of Mechanical Alloying Process and Sintering Methods on the Microstructure and Thermoelectric Properties of Bulk Bi0.5Sb1.5Te3 Alloy. *Intermetallics* 43, 16 (2013).

Li, Y. Y.; Qin, X. Y.; Li, D.; Zhang, J.; Li, C.; Liu, Y. F.; Song, C. J.; Xin, H. X.; Guo, H F Enhanced Thermoelectric Performance of Cu2Se/Bi0.4Sb1.6Te3 Nanocomposites at Elevated Temperatures. *Appl. Phys. Lett.* 2016, 108, 3-8.

Y. Liu, Y. Zhang, K. H. Lim, M. Ibanez, S. Ortega, M. Li, J. David, S. Marti-Sanchez, K. M. Ng, J. Arbiol, M. V. Kovalenko, D. Cadavid, and A. Cabot, *ACS Nano* 12, 7174 (2018).

D. Madan, A. Chen, P. K. Wright, and J. W. Evans, Dispenser Printed Composite Thermoelectric Thick Films for Thermoelectric Generator Applications. *J. Appl. Phys.* 109, 034904 (2011).

D. Madan, Z. Wang, A. Chen, R. C. Juang, J. Keist, P. K. Wright, and J. W. Evans, Enhanced Performance of Dispenser Printed MA N-Type Bi2Te3 Composite Thermoelectric Generators. *ACS Appl. Mater. Interfaces* 4, 6117 (2012a).
D. Madan, A. Chen, P. K. Wright, and J. W. Evans, Printed Se-doped MA N-Type Bi2Te3 Thick-Film Thermoelectric Generators. *J. Electron. Mater.* 41, 1481 (2012b).
D. Madan, Z. Wang, A. Chen, P. K. Wright, and J. W. Evans, W. High-Performance Dispenser Printed MA P-Type Bi0.5Sb1.5Te3 Flexible Thermoelectric Generators for Powering Wireless Sensor Networks. *ACS Appl. Mater. Interfaces* 5, 11872 (2013).
D. Madan, Z. Wang, A. Chen, R. Winslow, P. K. Wright, and J. W. Evans, Dispenser printed circular thermoelectric devised using Bi and Bi0.5Sb1.5Te3 *Appl. Phys. Lett.* 104, 013902, (2014).
D. Madan, Z. Wang, P. K. Wright, and J. W. Evans, Printed Flexible Thermoelectric Generators for Use on Low Levels of Waste Heat. *Appl. Energy* 156, 587 (2015).
D. Madan, X. Zhao, R. M. Ireland, D. Xiao, H. E. Katz, Conductivity and power factor enhancement of n-type semiconducting polymers using sodium silica gel dopant, APL Mater. 5 (2017), 086106.
Y. P. Mamunya, V. V Davydenko, P. Pissis, and E. V Lebedev, Electrical and Thermal Conductivity of Polymers Filled with Metal Powders. *Eur. Polym. J.* 38, 1887 (2002).
C. G. T. Neto, J. A. Giacometti, A. E. Job, F. C. Ferreira, J. L. C. Fonseca, and M. R. Pereira, Thermal Analysis of Chitosan Based Networks. *Carbohydr. Polym.* 62, 97 (2005).
Park S H, Jo S, Kwon B, Kim F, Ban H W, Lee J E, et al. High-performance shape-engineerable thermoelectric painting. Nat Commun 2016; 7:1-10.
Park J W, Kim C S, Choi H, Kim Y J, Lee G S, Cho B J. A flexible micro-thermoelectric generator sticker with trapezoidal-shaped legs for large temperature gradient and high-power density. *Adv Mater* Techno 2020; 5(10): 2000486.
B. Poudel, Q. Hao, Y. Ma, Y. Lan, A. Minnich, B. Yu, X. Yan, D. Wang, A. Muto, D. Vashaee, X. Chen, J. Liu, M. S. Dresselhaus, G. Chen, and Z. Ren, High-Thermoelectric Performance of Nanostructured Bismuth Antimony Telluride Bulk Alloys. *Science* 320, 634, (2008).
Rowe, D. M.; Thermoelectrics Handbook: Macro to Nano; CRC Press: Boca Raton, 2006. S. Sahoo, V. R. Chitturi, R. Agarwal, J. W. Jiang, and R. S. Katiyar, Thermal Conductivity of Freestanding Single Wall Carbon Nanotube Sheet by Raman spectroscopy. *ACS Appl. Mater. Interfaces* 6, 22 (2014).
M. Schrade, H. Fjeld, T. Norby, and T. G. Finstad, Versatile apparatus for thermoelectric characterization of oxides at high temperatures. *Rev. Sci. Instrum.* 85, 103906 (2014).
G. J. Snyder and E. S. Toberer, Complex Thermoelectric Materials. Mater. Sustain. Energy A 2010, 7, 2, 101-110.
M. Takashiri, K. Miyazaki, S. Tanaka, J. Kurosaki, D. Nagai, and H. Tsukamoto, Effect of grain size on thermoelectric properties of n-type nanocrystalline bismuth-telluride based thin films. *J. Appl. Phys.* 104, 084302 (2008).
T. Varghese, C. Dun, N. Kempf, M. Saeidi-Javash, C. Karthik, J. Richardson, C. Hollar, D. Estrada, Y. Zhang, Flexible thermoelectric devices of ultrahigh power factor by scalable printing and interface engineering, *Adv. Funct. Mater.* 30 (5) (2019), 1905796.
X. Yan, B. Poudel, Y. Ma, W. S. Liu, G. Joshi, H. Wang, Y. Lan, D. Wang, G. Chen, and Z. F. Ren, Experimental studies on anisotropic thermoelectric properties and structures of n-type Bi2Te2.7Se0.3. *Nano Lett.* 10, 3373 (2010).
C. Yu, Y. S. Kim, D. Kim, and J. C. Grunlan, Thermoelectric Behavior of Segregated-Network Polymer Nanocomposites. *Nano Lett.* 8, 4428 (2008).
Yuan Z, Tang X, Xu Z, Li J, Chen W, Liu K, et al. Screen-printed radial structure micro radioisotope thermoelectric generator. *Appl Energy* 2018; 225:746-54.
L. D. Zhao, B. P. Zhang, W. S. Liu, and J. F. Li, Effect of Mixed Grain Sizes on Thermoelectric Performance of Bi2Te3 Compound. *J. Appl. Phys.* 105, 023704 (2009).
X. Zhao, D. Madan, Y. Cheng, J. Zhou, H. Li, S. M. Thon, A. E. Bragg, M. E. DeCoster, P. E. Hopkins, H. E. Katz, High conductivity and electron-transfer validation in an n-type fluoride-anion-doped polymer for thermoelectrics in air, *Adv. Mater.* 29 (34) (2017), 1606928.

What is claimed is:

1. A method of making a thermoelectric composite film, said method comprising:
    applying a thermoelectric (TE) ink onto a substrate, wherein a TE ink is drop-casted or screen-printed onto the substrate to produce a TE film;
    curing the TE film at a curing temperature for a time necessary to drive off the at least one solvent; and
    applying uniaxial pressure in a range from about 100 MPa to about 200 MPa to the cured TE film, at temperature in a range from about 100° C. to about 200° C., for time in a range from about 5 minutes to about 100 minutes, to modify the at least one TE material to produce a modified TE composite film having a have a figure of merit (ZT) in a range of at least about 0.5 to 1.0,
    wherein the TE ink comprises at least one TE material, chitosan, and at least one solvent, wherein the at least one TE material comprises bismuth and tellurium, and wherein the amount of chitosan present in the TE ink is in a range from greater than zero to less than about 1 wt %, based on the total weight of the TE ink.

2. The method of claim 1, wherein the at least one TE material comprises a heterogeneous size distribution of P-type or N-type TE particles.

3. The method of claim 2, wherein a P-type TE material comprises a bismuth-telluride (Bi—Te)-base and further includes at least one of Sb, Ni, Al, Cu, Ag, Pb, B, Ga, Zn, S, Si, Se, Fe, Cr, Cd, Sn, Ge, Ca, In, or any combination thereof.

4. The method of claim 2, wherein a N-type TE material comprises a bismuth-telluride (Bi—Te)-base and further includes at least one of Se, Ni, Al, Cu, Ag, Pb, B, Ga, Mg, Si, Sn, S, In, or any combination thereof.

5. The method of claim 1, wherein the at least one TE material comprises nanoscale particles and microscale particles, wherein at least 60% of the TE particles are 149 microns in size, or less.

6. The method of claim 1, wherein the curing temperature is less than about 150° C. and the time necessary to cure the TE film is in a range from about 5 minutes to about 30 minutes.

7. The method of claim 1, wherein the at least one TE material comprises a heterogeneous size distribution of P-type or N-type TE particles and after uniaxial pressure application, smaller TE nanoparticles fill the voids between larger TE microparticles.

8. The method of claim 1, wherein the uniaxial pressure applied is in a range from about 150 to about 200 MPa.

9. The method of claim 1, wherein the substrate is flexible.

10. The method of claim 1, wherein the substrate comprises material selected from the group consisting of polymer, foam, silicone, glass, woven textiles, unwoven textiles, a combination of polymer and textile, chitosan, metals, ceramic, KEVLAR, KAPTON, polyimide-laminate circuit-board materials, and any combination thereof.

11. The method of claim 1, further comprising coating the substrate with a coating material prior to application of the TE ink onto the substrate.

12. The method of claim 1, wherein the substrate comprises KEVLAR.

13. The method of claim 1, wherein the modified TE composite film has a ZT in a range of at least about 0.6 to 1.0.

14. The method of claim 11, wherein the coating material comprises chitosan.

15. The method of claim 11, wherein the coating material comprises gold.

16. The method of claim 1, wherein the amount of chitosan present in the TE ink is in a range from greater than zero to less than about 0.1 wt %, based on the total weight of the TE ink.

17. The method of claim 1, wherein the modified TE composite film has a ZT in a range of at least about 0.7 to 1.0.

18. The method of claim 2, wherein the TE material comprises Bi, Te and Sb.

* * * * *